United States Patent [19]
Churchill et al.

[11] Patent Number: 5,407,119
[45] Date of Patent: Apr. 18, 1995

[54] LASER BRAZING FOR CERAMIC-TO-METAL JOINING

[75] Inventors: Russell J. Churchill; Usha Varshney; Howard P. Groger; James M. Glass, all of Radford, Va.

[73] Assignee: American Research Corporation of Virginia, Radford, Va.

[21] Appl. No.: 988,876

[22] Filed: Dec. 10, 1992

[51] Int. Cl.$^6$ .................. B23K 26/00; B23K 1/005
[52] U.S. Cl. ........................ 228/124.5; 228/232; 228/262.2; 219/121.64; 65/59.22; 65/59.5
[58] Field of Search .......... 228/124.5, 231, 232, 228/262.2; 65/59.21, 59.22, 59.5; 219/121.64

[56] References Cited

U.S. PATENT DOCUMENTS

| | | | |
|---|---|---|---|
| 3,113,878 | 12/1963 | Martin | 65/59.22 |
| 3,217,088 | 11/1965 | Steierman | 219/121.64 |
| 4,536,203 | 8/1985 | Kramer | 65/59.22 |
| 4,705,933 | 11/1987 | van Bennekom et al. | 219/121.64 |
| 4,883,217 | 11/1989 | Dunn et al. | 228/124.5 |
| 4,906,812 | 3/1990 | Nied et al. | 219/121.63 |
| 4,959,522 | 9/1990 | Rossi | 219/121.63 |
| 4,983,237 | 1/1991 | Alfing | 219/121.63 |

FOREIGN PATENT DOCUMENTS

| | | | |
|---|---|---|---|
| 2735231 | 2/1979 | Germany | 219/121.64 |
| 60-16876 | 1/1985 | Japan | 219/121.64 |

Primary Examiner—P. Austin Bradley
Assistant Examiner—Jeffrey T. Knapp
Attorney, Agent, or Firm—James Creighton Wray

[57] ABSTRACT

The laser brazing of the present invention offers the unique advantage of producing a high temperature hermetic bond while limiting the heat affected zone to the region of the joint. Laser brazing joins infrared (IR) and radio frequency (RF) ceramic materials to metals for radome applications. Using AG—Cu—Ti brazing alloys, zinc sulfide (ZnS) infrared windows were laser brazed to cylindrical titanium housings with no thermal degradation observed in crystalline properties of ZnS. Innovative glass-ceramic materials were also used as braze filler to produce over 30 ceramic-to-metal couples, including titanium Zns, Pyroceram/Kovar and niobium/sapphire. Benefits are in the production of strong, high temperature, hermetically sealed joints in aircraft and high velocity missile systems. An optimized laser brazing system is provided.

16 Claims, 14 Drawing Sheets

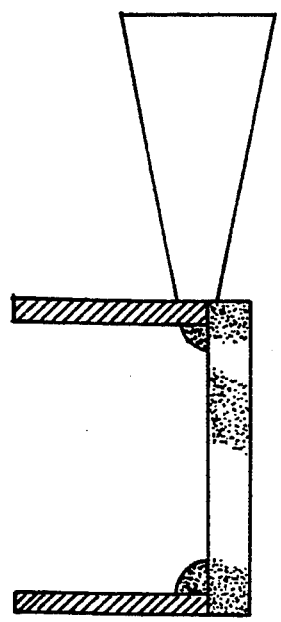 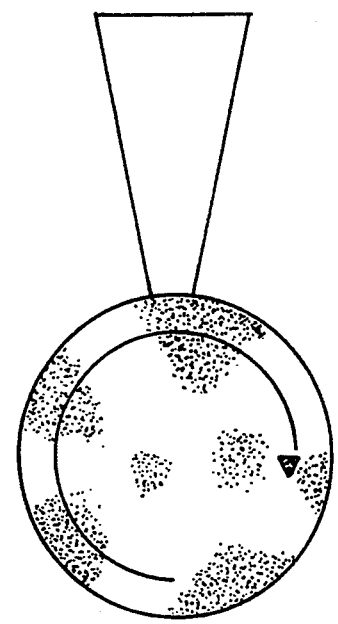
FIG. 14a   FIG. 14b
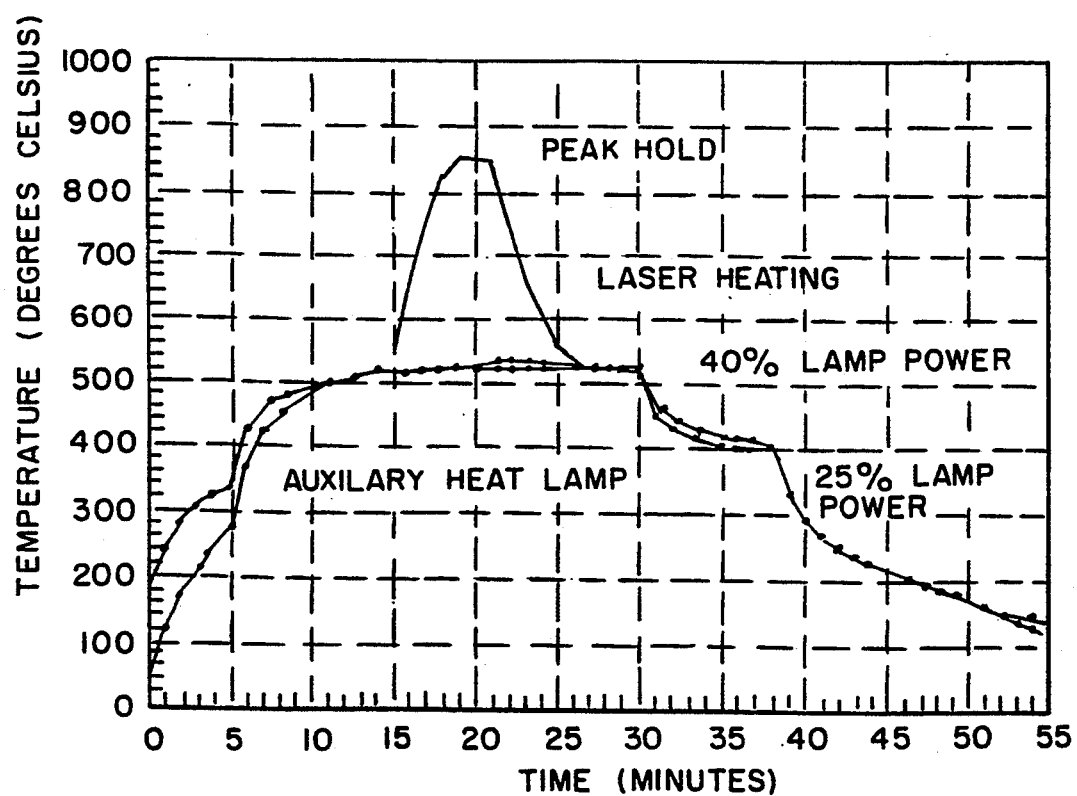
FIG. 15

LASER BRAZING FOR CERAMIC-TO-METAL JOINING

The United States Government has a royalty-free license for use of this invention by the United States Government.

BACKGROUND OF THE INVENTION

Advanced ceramic materials having applications as infrared (IR) or radio frequency (RF) transmitting window materials are being developed to meet the increasing performance requirements of strategic and battlefield missile systems. Ceramic materials which have been identified for window and radome applications include zinc sulfide (ZnS), PYROCERAM, RAYCERAM, sapphire and various glass-ceramics, yttria-based materials and others. At present, these materials are attached to the body of the missile using polymeric adhesives or epoxies. There is a need to develop hermetic joints between the advanced ceramic materials and the metallic elements comprising the body of the missile. These joints must be able to withstand temperatures in excess of 550° C. for one minute or more and cyclic thermal environments from −40° to 200°. Existing polymeric materials cannot meet these requirements. Further, furnace heating of ceramic or metallic brazes to join the advanced IR or RF window components often results in degradation of the optical or microwave properties of the window.

Laser brazing offers the potential to reduce damage to the radome or infrared window during assembly by limiting the thermal degradation to regions adjacent to the joint. A focused laser beam provides a highly localized heat source necessary to form a metallurgical bond without affecting the bulk material.

Currently ceramic window or radome components can be joined to metals by mechanical fasteners, epoxy adhesives, or low-melting sealing glass. Higher temperature joints are possible using glass-ceramic materials or metallic braze alloys provided the inherent processing requirements can be met. The basic requirements for strong assemblies are chemical bonding and favorable stress gradients in the interfacial zone. This section describes conventional brazing and glass-ceramic sealing technology used for ceramic-to-metal joining.

The major problem of joining ceramic to metal is the difference in thermal expansion of the materials. In most cases, the metal to be joined has a higher thermal expansion than does the ceramic. Equally important in terms of joint reliability are the changes of coefficients due to composition gradients and microstructures that form because of the reactions at the interfaces. The ceramic and metallic components should be selected to minimize thermal expansion differences throughout their operating range. In general, the most reliable joints are those which form a thicker interfacial zone with a more extended and graded microstructure.

Brazing is uniquely suited to the fabrication of ceramic-to-metal joints and seals due to the introduction of a liquid phase at the interface which facilitates reactions, diffusion and stable chemical bonds. The conventional practice of brazing ceramics to metals involves a two step metallizing process in which a thin layer of metal is bonded to the ceramic component to improve the wettability of the ceramic surfaces by conventional low temperature filler metals. The metals are usually deposited by electroplating; however, in certain cases the coatings are produced by reducing oxides or sintered metal powder techniques.

The most widely known ceramic brazing process is the "molymanganese" process in which paint comprised of Mo and Mn powder is applied to the ceramic, generally $Al_2O_3$ or BeO, and fired in a controlled hydrogen atmosphere to create a strongly adherent viscous melt composed of metals and residual oxides not completely reduced by sintering. This surface is usually plated with a 2 to 4 μm thick layer of Ni or Cu, providing a surface which can be wetted easily by filler materials.

A more direct approach to ceramic/metal joining is the brazing of ceramics to metals using active filler metals. Because this is a one step process, it is simpler and more economical. In this process, a highly reactive metal is added to a normal braze alloy to promote chemical reaction and wetting at the ceramic interface. The most widely accepted alloy of this type is a silver-copper composition containing approximately 2% titanium, which is commercially available under the trade names CUSIL-ABA (GTE), LUCANEX 721 (Lucas-Milhaupt) and others. The high oxidation potential of titanium causes it to undergo a redox reaction with ceramic resulting in the spreading of the braze and formation of an oxide compound at the interface that is compatible with both phases, and produces a chemical bond at the interface. The alloy allows vacuum brazing in one step and can wet most metals without prior nickel plating of the substrate.

Another approach is the joining of a ceramic and a metal by an interlayer of glass. The normal procedure for achieving chemical bonding and favorable stress gradients in glass/metal joints is to preoxidize the metal and apply the glass in liquid phase. An example of this approach is the bonding of alumina to niobium in sodium vapor lamps. A glass filler consisting of Ca—Mg—$Al_2O_3$ is placed in the joint, and the assembly is heated to approximately 1400° C. to form a glass seal, primarily through the reaction of metal oxide ($Al_2O_3$) with the liquid. The extent of the reaction and degree of crystallization are controlled by the heating schedule. Transformation of the glass into a high strength, multiphase glass-ceramic can occur during a carefully controlled high temperature furnace cycle consisting of three major segments: (1) seal segment flow of the glass and subsequent formation of a seal with the various metal substrates; (2) nucleation segment development of crystal nuclei in the glass; and (3) growth segment formation of crystals on nuclei, transforming the glass into a glass-ceramic.

The principal advantages of the glass-ceramic materials over conventional ceramics are associated with the absence of porosity in recrystallized materials to form a hermetic seal. The glass-ceramic material consists of a large portion of well-dispersed small crystals, generally smaller than 1 micron, along with a small amount of residual glass phase. The particular material properties can be programmed to a significant extent by a systematic variation of the chemistry and microstructure of the starting materials containing both glassy and crystalline phases, and by the selection of suitable crystallization process conditions. The coefficients of thermal expansion of these glass-ceramics are compatible with those of ceramic and metal over the temperature range of 77K to 1275K having a tailorable coefficient of thermal expansion ranging from 0.5 to $5.0 \times 10^{-6}$/°C.

The use of lasers for industrial processing of materials has increased steadily since the first successful operation of a laser in 1960. During the past decade in particular, the industrial laser industry has matured, and acceptance of lasers as viable production tools has become widespread. Laser processing of materials has generally been accomplished using industries $CO_2$ lasers. The $CO_2$ laser is the most powerful laser available and can produce power outputs in the multi-kilowatt range.

The interaction between a laser beam and the surface of a metal or ceramic is controlled primarily by the incident power density and the available interaction time. The laser-material interaction spectrum for high power industrial lasers is shown in FIG. 1. A particular combination of power density and interaction time defines a specific operational regime within the interaction spectrum. The laser brazing process would fall on the spectrum between the welding/cladding regime and the heat treatment regime (power density $10^4$–$10^5$ W/cm$^2$, interaction time 0.1–1.0 sec.). The diagonal lines in FIG. 1 represent constant specific energy inputs which are computed as the product of the power density and the interaction time. Thus, it is not primarily the quantity of energy applied, but the power density and the rate at which the energy is applied, which produces the specific material processing effect desired. When the radiation intensity exceeds a critical value, the laser/material interactions are accompanied by a laser-induced plasma in front of the target surface. For continuous-wave $CO_2$ laser irradiation of a metal, the threshold for plasma onset is about $10^6$ W/cm$^2$. The formation of plasma should be avoided for laser brazing.

The coefficient of absorption (or reflection) for a given metal is affected by alloy concentration, surface roughness and degree of surface oxidation, and is also strongly temperature dependent. The amount of energy absorbed is also dependent upon the laser wavelength. Ferrous alloys typically have reflection coefficients of around 85% at room temperature. Fortunately the reflectivity decreases significantly at elevated temperatures. As the metal approaches its melt temperature, the absorption changes abruptly to near unity and additional energy coupling mechanisms take effect which are highly advantageous in cutting and welding applications.

The brazing process is best described as a form of heat treatment, since neither of the structural components in the joint is to be melted; only the filler material is raised above its melt temperature. Laser heat treatment processes have received a great deal of attention and have been successfully utilized in industrial applications of transformation hardening of ferrous alloys. In this process, a thin layer of the substrate is rapidly heated well into the austenitizing temperature by laser heating and subsequently cooled at a very fast rate, due to self quenching by conduction into the bulk part, to form a martensitic structure. The depth of hardening is closely determined by laser power, beam diameter and traverse speed.

Another factor affecting the joint thermal profile is the intensity distribution of the laser beam. Unlike laser welding or cutting, a wider beam with uniform energy distribution is desired to perform laser brazing. This can be accomplished by defocusing the laser beam or by altering the mode structure in the resonator. For example: changing the mode from the Gaussian distribution ($TEM_{00}$) to a 'donut' shaped mode ($TEM_{01}$) will give more uniform heating. More elaborate distributions have been achieved using scanning mirrors and reflective optics. In any case, a power density of at least $10^3$ W/cm$^2$ is usually needed.

The efficiency of laser heat treatment depends upon the absorption of laser energy by the work surface. Due to the reflectivity problems discussed earlier, some absorbent coatings are almost always used during laser heat treating. Most commonly used absorbent coatings include colloidal graphite, manganese phosphate, zinc phosphate and black paint. These coatings can increase absorptivity values to between 50% and 80%. Care must be taken to ensure that such additives do not contaminate the braze compositions.

The simplest approach to laser brazing is to heat the substrate or base metal adjacent to the joint and to rely upon thermal conductivity to heat the joint and filler metal to the brazing temperature. Under these conditions the controlling factors determining the temperature distribution are the geometry of the joint, the thermal conductivity of the materials and the coupling coefficient of the laser beam energy with the metal surface. Shining the beam directly on the filler materials is more problematic and often results in the braze materials being blown away by uncontrollable kinetic reactions in the interaction zone. However, this approach is necessary if glass-ceramic materials are used which have low thermal conductivity and a melt temperature above the metal component.

Most laser joining efforts have been directed toward fusion welding between similar or metallurgically compatible materials. The number of literature references to laser brazing or laser joining of ceramics is very limited. This is probably due to the innate tendency of ceramics to crack in the fused region during localized heating. However, supplementary heating and control of the heating and cooling cycles have enabled sound welds to be made in some ceramics. Joint strengths of up to 80 MPa (12 ksi) have been provided in $CO_2$ laser-welded alumina up to 44 mm thick. A technique for laser-activated brazing of $Si_3N_4$ ceramics using a $CO_2$ laser beam for local heating and a mixture of refractory ceramic powders as brazing filler material has been reported. Again a furnace is used to preheat the part to 1100° C. and the laser is used to elevate the braze to the brazing temperatures of 1680° to 1850° C. Laser brazing was accomplished in a very short time period (110 to 150 seconds), due to the high fluidity and reaction rate of the molten filter material. The narrow gap (3 to 5 $\mu$m) butt-joint was filled with laser-activated molten braze by capillary attraction.

The above examples involve laser joining of ceramics to ceramics. Some work has also been reported on laser brazing of thin sections of metal using low heat input to minimize distortion. Both $CO_2$ and Nd:YAG lasers were used to melt a variety of metal and powder filler materials including stainless steel, KOVAR, molybdenum and titanium. The best results were obtained using a low repetition rate pulsed Nd:YAG laser in the $TEM_{01}$ mode with a defocused beam fired directly over the preplaced filler metal.

SUMMARY OF THE INVENTION

A six month study was performed to evaluate the feasibility of laser brazing to join infrared (IR) and radio frequency (RD) ceramic components to cylindrical metal surfaces for radome applications. The high temperatures associated with conventional furnace brazing can degrade the optical properties of the materials and promote chemical reaction between the metal and the ceramic throughout the heat affected zone (HAZ). Laser brazing offers the unique advantage of producing a high temperature, hermetic bond while limiting the HAZ to the region of the joint. The technical objectives included evaluation of candidate brazing materials, design of a vacuum laser processing chamber, selection of laser processing parameters, acquisition of families of test data and optimization of a concept system for engineering development.

Experiments were performed to join circular ceramic window materials to sections of metal tubing in a specially designed laser processing vacuum chamber. Candidate ceramic and metallic materials having matched thermal expansion characteristics were selected and prepared. Samples were processed using a 600 watt $CO_2$ laser beam focused through a ZnSe window onto the rotating samples located inside the chamber. Innovative glass-ceramic materials, as well as commercial Ag—Cu—Ti alloys, were used as braze filler. Laser parameters and preheat conditions were adjusted to achieve metallurgical bonding at the joint. Over 30 ceramic-to-metal couples were produced, including combinations of titanium/zinc sulfide, PYROCERAM/KOVAR and niobium/sapphire. Pyroceram is an IR and RF transmitting ceramic window material.

The materials samples were tested for mechanical stability by thermal cycling and furnace heating up to 500° C., and selected samples were tested for hermeticity using halogen leak detection and vacuum testing. Sections of braze interface were examined for bond integrity and chemical diffusion using scanning electron microscopy, elemental analysis (EDX) and X-ray diffractometry. Brazed joints withstood up to 12 cycles from 550° C. to liquid nitrogen temperature before failure and 50 cycles from 0° C. to 200° C.

Results indicate that laser brazing is feasible using secondary heat sources to control the cooling rate. Using metallic brazing alloys, zinc sulfide windows were laser brazed to cylindrical titanium housings with minimal HAZ and no thermal degradation of the bulk crystalline properties. The joints were air tight to pressures of 0.05 milliTorr and were able to withstand temperatures in excess of 550° C. Ceramic filler compositions were also found to be amenable to laser brazing with improved flow and wetting characteristics. The proof-of-concept system was optimized for further research and development.

The overall goal of the invention was to develop temperature stable ceramic-to-metal joints using laser brazing techniques. Specific objectives included identification and evaluation of candidate materials amenable to laser brazing of ceramic-to-metal joints. That objective addressed questions of thermal expansion, surface wetting and diffusion of the filler material to the braze components, and the strength, ductility and durability of the resulting joint.

The objectives included design and fabrication of a laser processing vacuum chamber. Questions of beam delivery, braze atmosphere, sample handling and instrumentation were addressed.

Laser process parameters were developed for fabrication of bonded ceramic-to-metal couples. Optimum laser power density, spot size, power level, joint geometry and traverse speed were discovered by producing test samples under a range of laser process conditions.

Acquisition of families of test data were acquired through characterization of laser brazed ceramic-to-metal bonds. Questions were addressed of material compatibility, solid state diffusion, and adhesion of the ceramic-to-metal bond through microstructural and chemical analysis. Laser brazed materials were evaluated by scanning electron and optical microscopy. Samples were also subjected to heating to 550° C. for one minute or more or though 150 cycles from −40° C. to 200° C., to ensure bond stability under field operating conditions.

The proof-of-concept system was optimized for engineering development. Results of characterization of the bond samples were correlated with laser processes and material parameters to determine processing conditions and material stoichiometry. Practical methods to augment the laser brazing process were developed.

These and further and other objects and features of the invention are apparent in the disclosure, which includes the above and ongoing written specification, with the claims and the drawings.

BRIEF DESCRIPTION OF THE DRAWINGS

FIGS. 14a and 14b show braze filter placement and energy application.

FIG. 15 shows a laser processing temperature profile.

FIGS. 16a and 16b through 18a and 18b show secondary electron images and X-ray maps of selected interfaces.

DETAILED DESCRIPTION OF THE DRAWINGS

Figure 1:
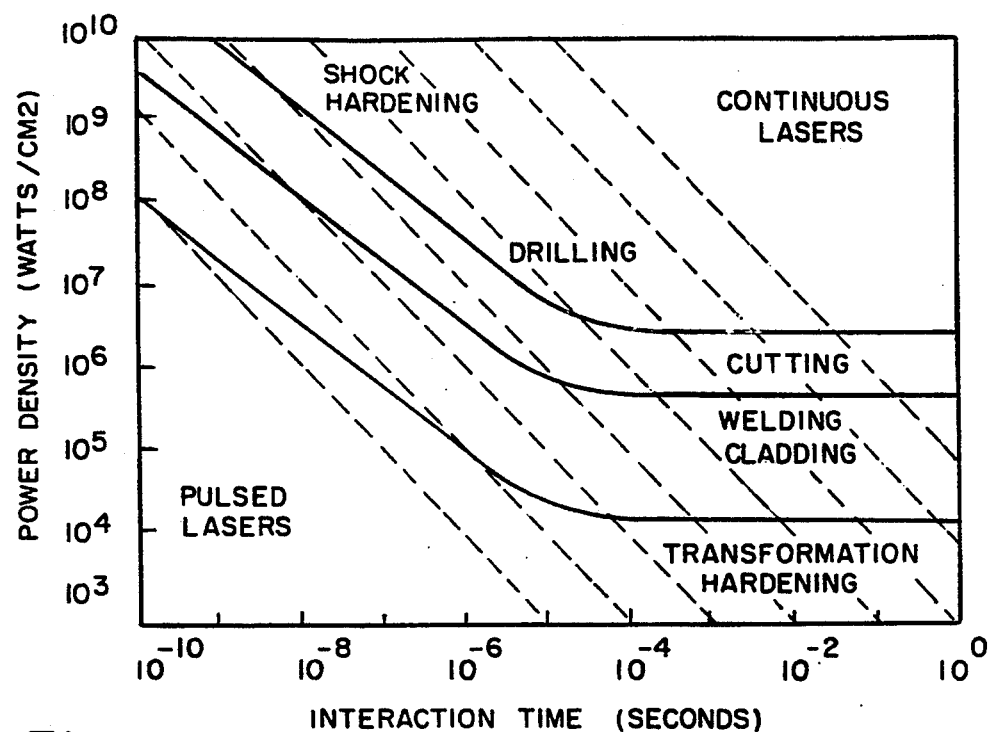
FIG. 1 is a chart of laser/material interactions.

The selection of ceramic and metal candidate materials was made primarily on the basis of thermal expansion. Ceramic materials were selected from systems which are currently in production under various contracts or have demonstrated some degree of feasibility in prior joining efforts. It is believed that concentrating on these systems will yield the highest probability of developing a method for use in military and commercial applications. A list of ceramic materials with IR or RF dome applications is given in Table I.

TABLE I

| Ceramic-to-Metal Joint Candidate Materials | | |
|---|---|---|
| Ceramic | Thermal Expansion* | Metal |
| Zinc Sulfide (ZnS) | 8 | Titanium |
| Lanthana-strengthened Yttria (LSY) | 7.9 | Niobium |
| Sapphire | 8.4 | Niobium |
| Spinel (MgO—3.5Al$_2$O$_3$) | 5.9 | Kovar |
| FK-5 Glass | 10.0 | Ti-6-4 |
| Germanium | 5.5 to 6.1 | Kovar |
| Slip Cast Fused Silica (SiO2) | 0.5 | Invar |
| Pyroceram | 4.5 | Kovar |

TABLE I-continued

Ceramic-to-Metal Joint Candidate Materials

| Ceramic | Thermal Expansion* | Metal |
|---|---|---|
| Nitroxyceram | 3.0 | Invar |

*Note: $\alpha$ = Approximate Linear Coefficient of Thermal Expansion, $10^{-6}/°C$.

Of the materials listed in Table I, several are of special significance. Multi-spectral ZnS is currently the best compromise, long wavelength infrared (LWIR) window material with respect to IR bandpass, rain erosion and thermal shock resistance. However, ZnS is subject to oxidation and/or decomposition at temperatures above 500°–600° C. For this reason, ZnS material cannot be brazed using conventional furnace methods where temperatures would typically exceed 800° C. and is a prime candidate for laser brazing. Sapphire is also currently used in many IR applications. Of the RF materials listed, fused silica and Pyroceram are used on military systems currently under production, and Nitroxyceram is under development and is expected to show improvements in mechanical properties.

Metals with moderate-to-low coefficients of thermal expansion are required to minimize thermally induced stress in the composite joints. Titanium ($\alpha=10$), niobium ($\alpha=8$), Kovar ($\alpha=5.4$) and Invar ($\alpha<2$) metals were selected for their moderate-to-low coefficients of expansion. Ti is commonly alloyed with Vanadium and Aluminum (Ti-6-4) for structural applications. Invar is a low expansion 64Fe-36Ni alloy, and Kovar, an iron-nickel-cobalt alloy, contains approximately 54Fe-29Ni-17Co. Niobium, also named Columbium, is closely matched to lanthana-strengthened yttria and sapphire. Stainless steel and aluminum alloys were also considered, but these were judged to have too great a thermal mismatch for the ceramics of interest.

In selecting the filler composition, several criteria must be met. The filler metal must be of suitable ductility, allow sufficient wetting on both the ceramic and metal surfaces, and allow controlled flow to a preplaced position. For optimal brazing, minimum filler-metal flow (blushing) on both the ceramic and base surface is required. The degree of blushing is a function of the filler metal and metal-substrate compositions, the brazing temperature and the atmosphere. The degree of filler-metal flow on the base metal usually increases with increase in brazing temperature.

Experiments were performed using conventional active metal brazing alloys such as Lucas-Milhaupt, Inc., Lucanex 721 and Cusil ABA (63 wt % Ag, 1.75 wt % Ti, balance Cu). Lucanex brazing pastes are used for bonding or hermetically sealing a broad range of ceramic and non-metal components to themselves and to other ceramics or metals without the need for molybdenum/manganese metallizing or other premetallizing treatments. These brazing alloys have been shown to produce successful bonds in components manufactured from alumina, silicon nitride, zirconia, diamond, titanium carbide, sapphire and graphite, when these materials are bonded to themselves or other appropriately selected metals. The braze alloys were laser melted on various substrates under the conditions given in Table II.

TABLE II

Laser Parameters for Evaluating Brazing Materials.

| Materials | Laser Parameters | Comment |
|---|---|---|
| 1. Cusil ABA/Niobium | $10^3$–$10^4$ Watts/cm$^2$ | no laser absorption |
| 2. Lucanex 721/Niobium | 100 Watts/cm$^2$ | good absorption |
| 3. Cusil ABA/Alumina | 100 Watts/cm$^2$ | alumina thermal fracture |
| 4. Lucanex 721/Alumina | 20 Watts/cm$^2$ | alumina thermal fracture |
| 5. Cusil ABA/titanium | 100 Watts/cm$^2$ | good absorption on Ti |
| 6. Cusil ABA/ZnS | 200 Watts/cm$^2$ | ZnS thermal fracture |
| 7. Ti/Cusil/ZnS | 1000 Watts/cm$^2$ | bonding, low strength |
| 8. Ti/Lucanex/ZnS | 1250 Watts/cm$^2$ | bonding, low strength |
| 9. Spodumene/Alumina | 2000 Watts/cm$^2$ | bonding, low strength |
| 10. Pb—Zn-borosilicate/Kovar | 1500 Watts/cm$^2$ | good flow, bonding |

Figure 2:
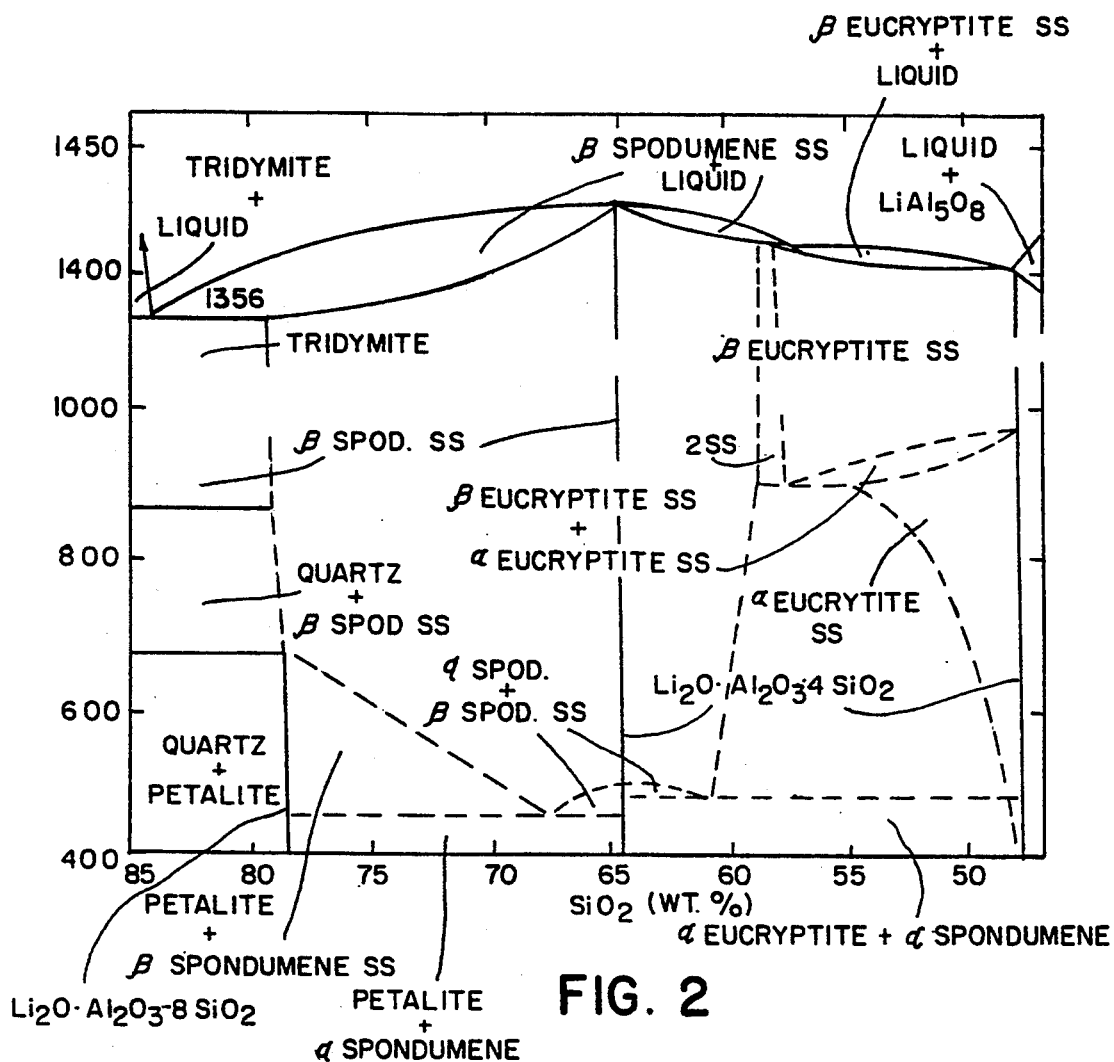
FIG. 2 is a phase equilibrium diagram.
Figure 3:
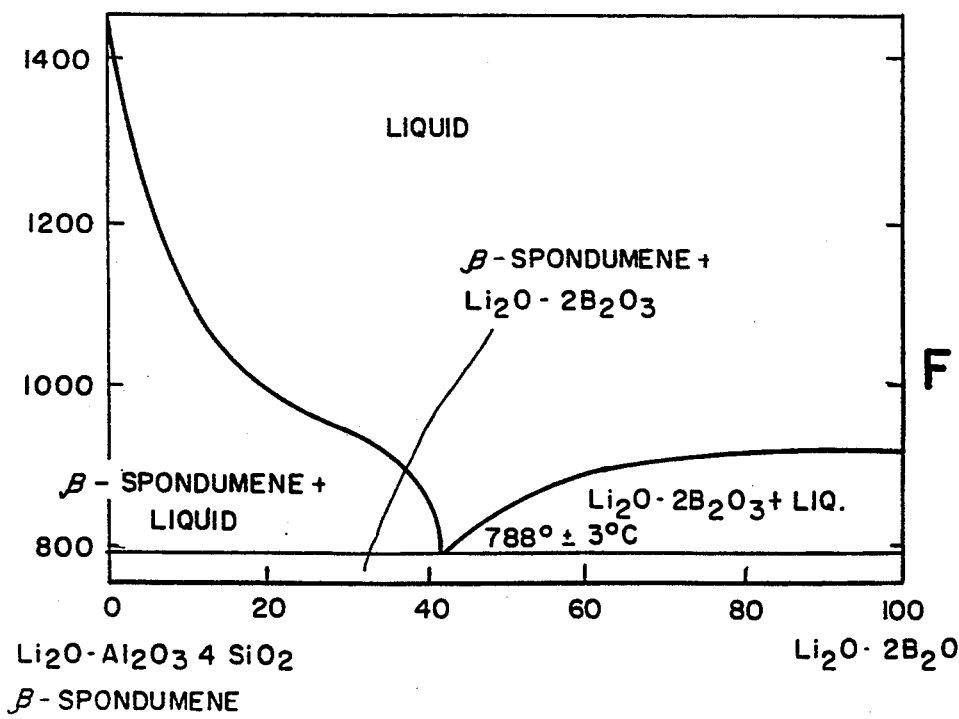
FIGS. 3–7 are system diagrams.
Figure 4:
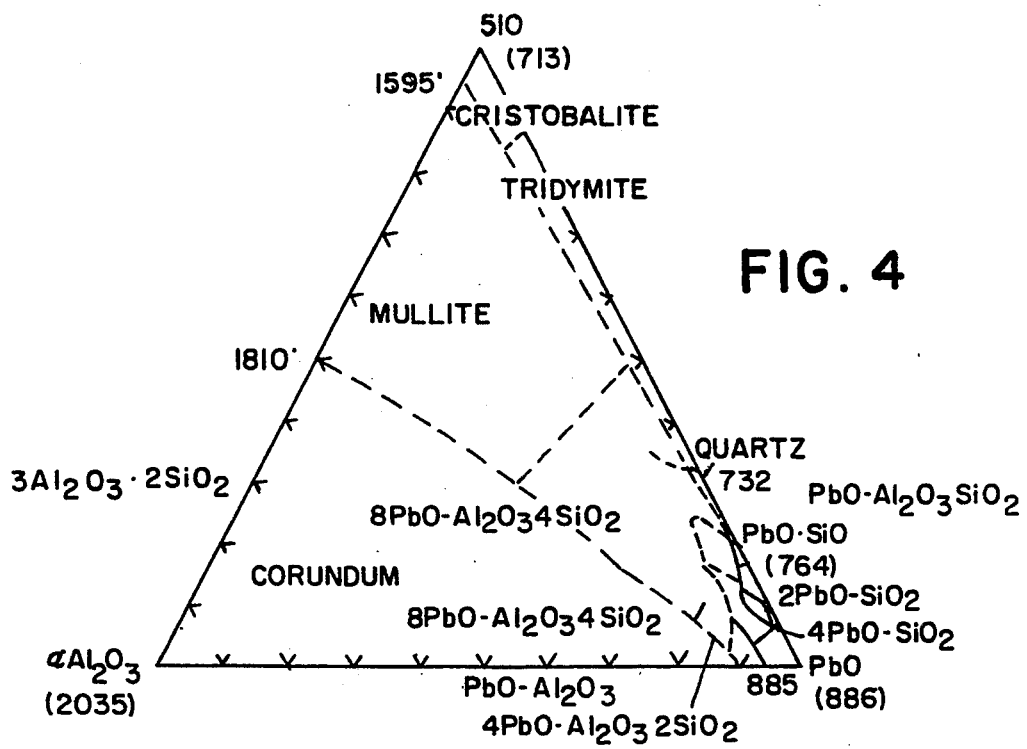
Figure 5:
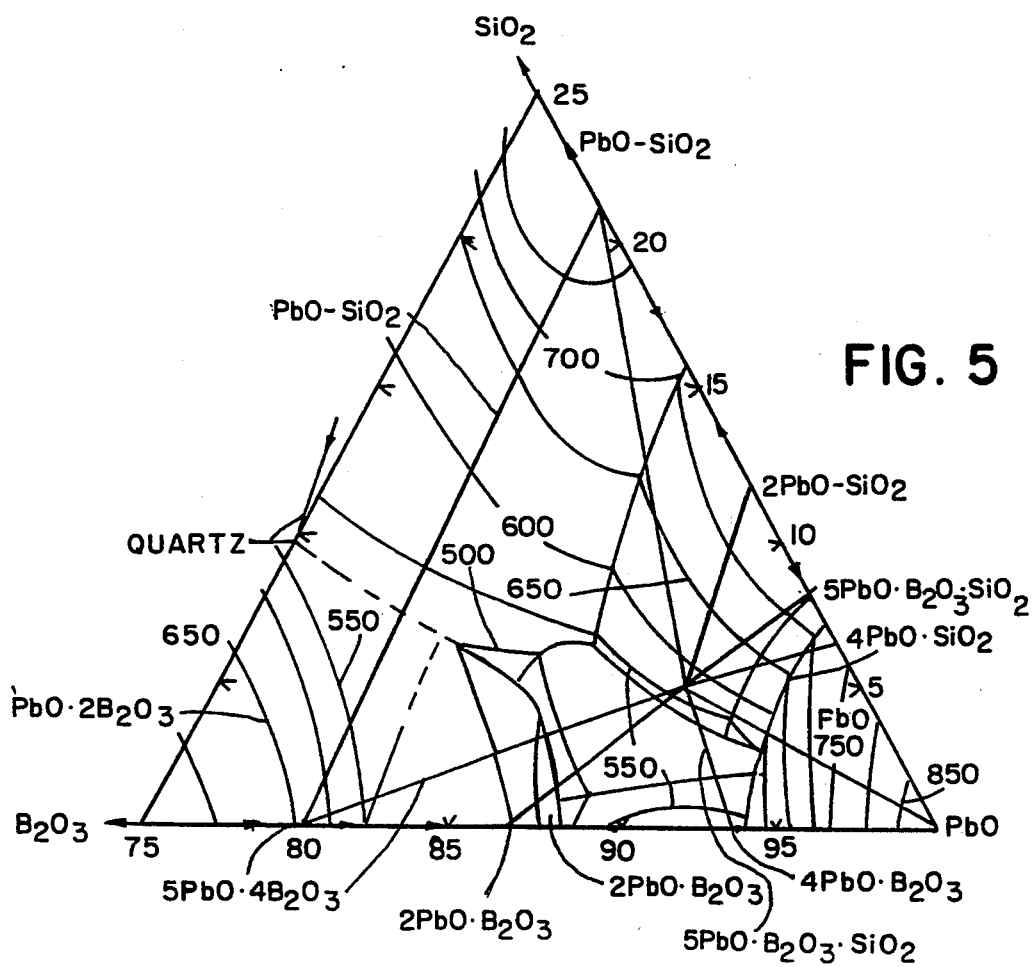
Figure 6:
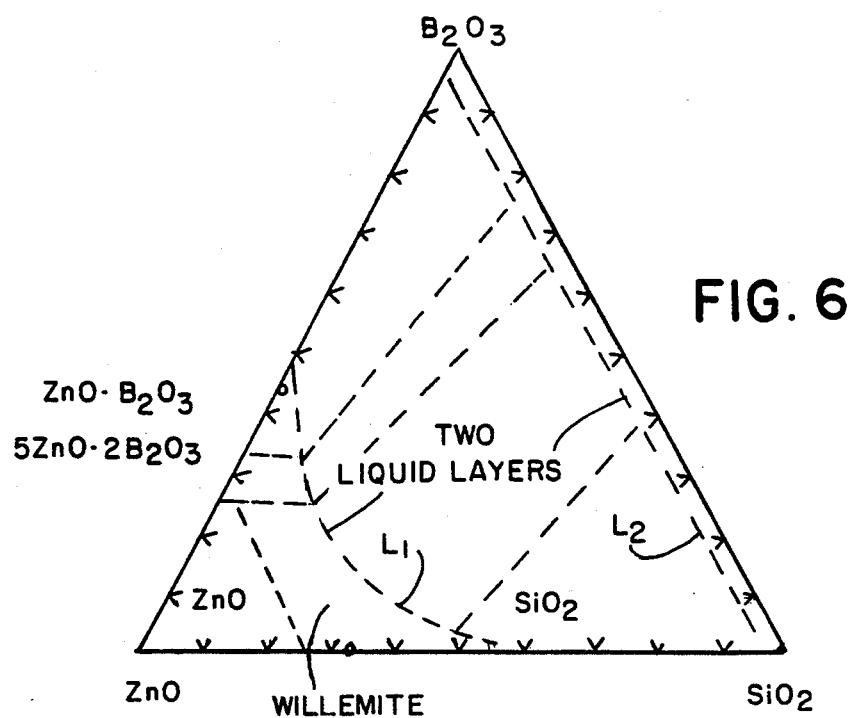
Figure 7:
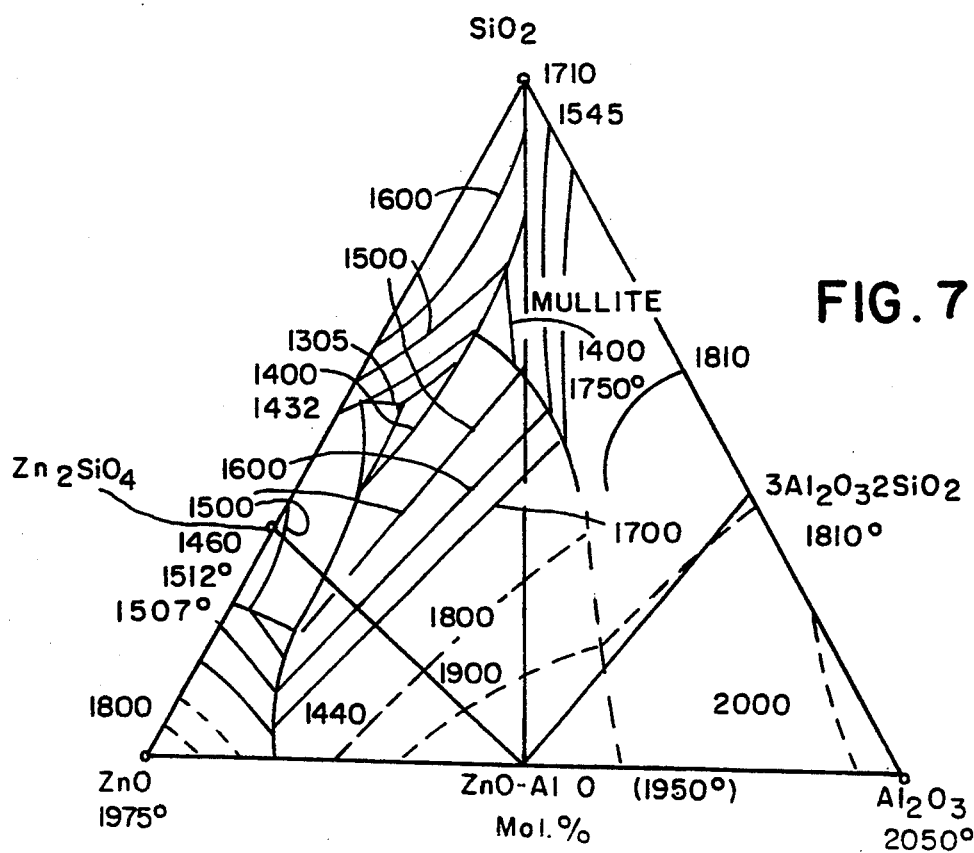

One of the innovations in this program is the investigation of laser processed glass fillers based on low thermal expansion glass-ceramic materials of spodumene or cordierite substituted with zinc The Li$_2$O—Al$_2$O$_3$—SiO$_2$ system is used for glass-ceramic materials having very low thermal expansion coefficients and hence very high resistance to thermal shock. The very low expansion coefficients in this system, which in some cases are appreciably lower than those for fused silica, are associated with the presence of crystalline $\beta$-spodumene (Li$_2$O—Al$_2$O$_3$—4SiO$_2$)or $\beta$-eucryptite (Li$_2$O—Al$_2$O$_3$—2SiO$_2$) which has a negative coefficient of thermal expansion. $\beta$-spodumene solid solution is a stable crystal phase with low coefficient of thermal expansion having compositions varying from Li$_2$O—Al$_2$O$_3$—4SIO$_2$ to Li$_2$O—Al$_2$O$_3$—10SiO$_2$. The phase equilibrium diagram as shown in FIG. 2 graphically represents the ranges of temperature, pressure and composition in which different phases are formed. $\beta$-spodumene has a further advantage of melting congruently.

One of the innovations is the investigation of laser processed glass fillers based on low thermal expansion glass-ceramic materials of spodumene or cordierite substituted with zinc. The Li$_2$O—Al$_2$O$_3$—SiO$_2$ system is used for glass-ceramic materials having very low thermal expansion coefficients and hence very high resistance to thermal shock. The very low expansion coefficients in this system, which in some cases are appreciably lower than those for fused silica, are associated with the presence of crystalline $\beta$-spodumene (Li$_2$O—Al$_2$O$_3$—4SiO$_2$) or $\beta$-eucryptite (Li$_2$O—Al$_2$O$_3$—2SiO$_2$) which has a negative coefficient of thermal expansion. $\beta$-spodumene solid solution is a stable crystal phase with low coefficient of thermal expansion having compositions varying from Li$_2$O—Al$_2$O$_3$—4SiO$_2$ to Li$_2$O—Al$_2$O$_3$—10SiO$_2$. The phase equilibrium diagram as shown in FIG. 2 graphically represents the ranges of temperature, pressure and composition in which different phases are formed. $\beta$-spodumene has a further advantage of melting congruently.

The following table details the thermal and mechanical properties of the powders evaluated.

TABLE III

Thermal and Mechanical Properties of Glass-Ceramic

| Powder | Composition | Weight % | Bulk Density gm/cm$^3$ | CTE 10$^{-6}$/°C. | Melting Temp. °C. |
|---|---|---|---|---|---|
| β spodumene | Li$_2$O | 8–4 | 1.78 | 0.9 between 20° C. and 1000° C. | 1400 |
|  | Al$_2$O$_3$ | 27–16 |  |  |  |
|  | SiO$_2$ | 65–82 |  |  |  |
| Lead Zinc Borosilicate Corning 7578 | PbO | 60–80 | 5.82 | 6.5 | 439 |
|  | SiO$_2$ | 1–20 |  |  |  |
|  | B$_2$O$_3$ | 1–20 |  |  |  |
|  | ZnO | 10–30 |  |  |  |
|  | Al$_2$O$_3$ | 1–20 |  |  |  |

Experiments were performed to evaluate the wetting and flow characteristics of new compositions of glass materials. When used as a brazing material, spodumene was observed to have difficulty in adhering to metal surface during laser brazing; whereas lead zinc borosilicate glass (Corning 7578) was observed to have good flow properties. The two glasses were combined in different weight percent ratios in order to achieve a dense glass ceramic material to form a hermetic seal between the glass and ceramic. A composition of 10% to 30% of spodumene added to 90–70 weight % of lead zinc borosilicate glass was observed to be an optimum composition as a filler material for laser brazing. The resultant composition is a complicated glass composite forming various phases as shown in FIGS. 3 to 7.

The addition of lead oxide, zinc oxide and boron oxide to spodumene was observed to lower the melting temperature and to improve the wetting properties and adherence of spodumene to ceramic as well as to the metal. Mixtures of 30% by weight of spodumene were added to the lead-zinc-borosilicate base and laser melted to join samples of KOVAR to PYROCERAM and Kovar to alumina. SEM photographs of the resulting bonds are shown in FIGS. 20-23. A detailed characterization of the final composition was performed to identify the phases formed and the characteristics of the glass materials.

Figure 8A:
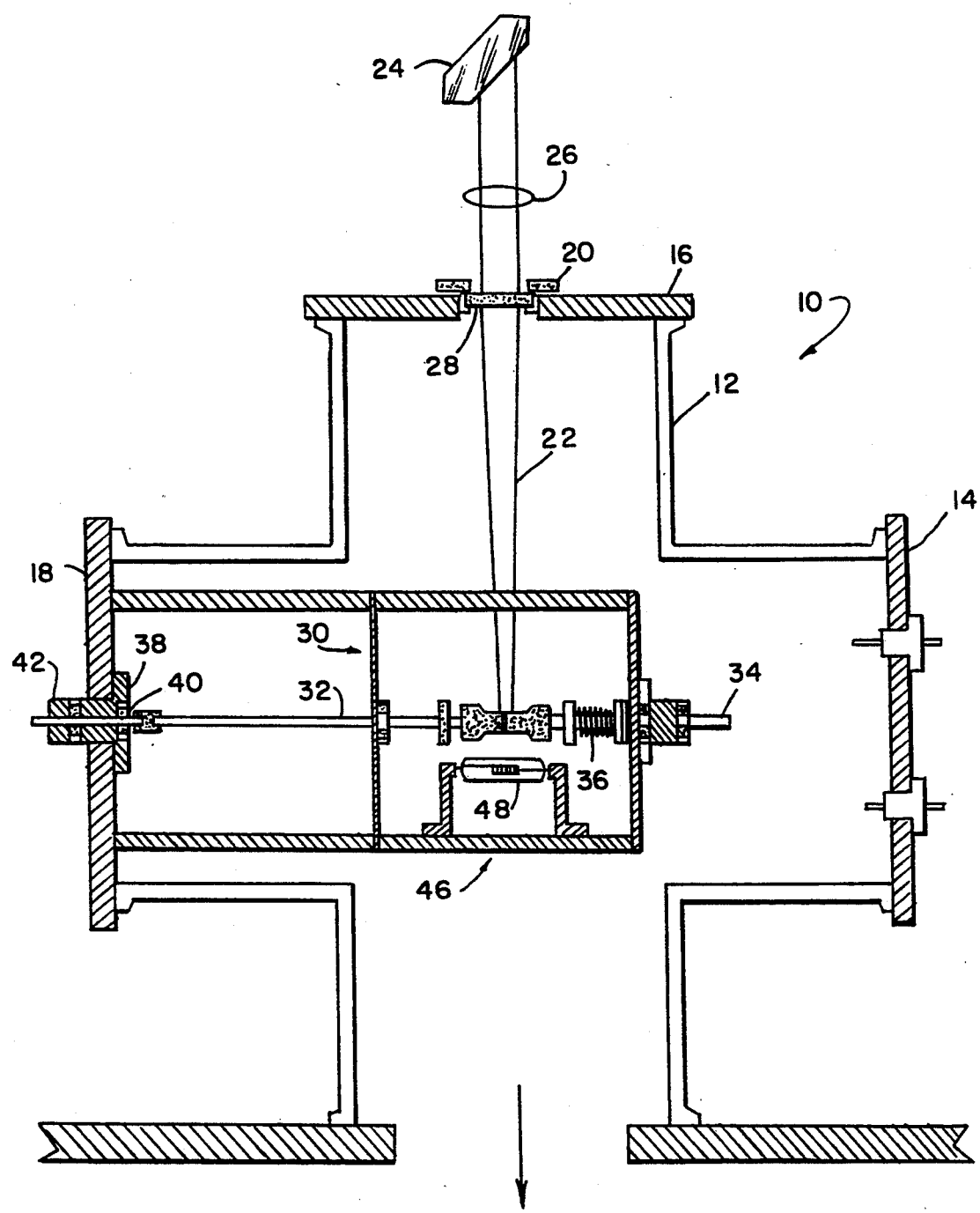
FIGS. 8a and 8b show laser brazing vacuum chambers.
Figure 8B:
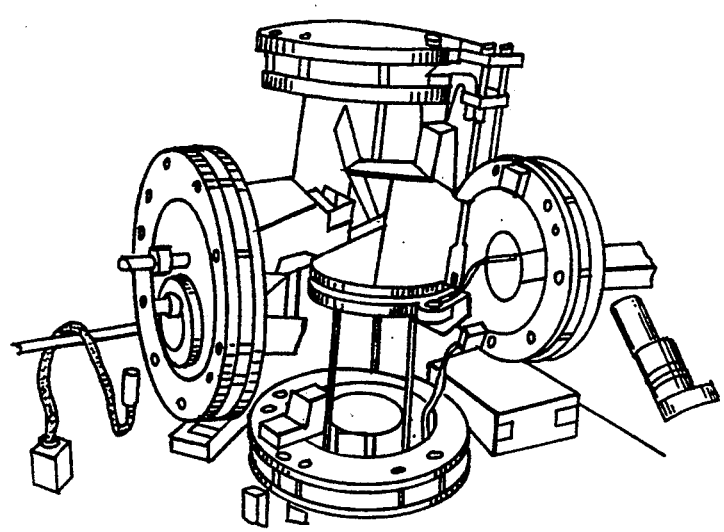

Processing in vacuum is necessary for many brazing operations, particularly when highly reactive metals such as titanium or titanium containing fillers are utilized to prevent oxidation reactions. A vacuum processing chamber was designed and constructed. The system has a four port glass chamber with openings for rotary sample holder, electrical and thermocouple feedthroughs, gas input and output vents, and a window port for laser beam inlet. The assembled vacuum chamber is shown in FIGS. 8a and 8b.

The vacuum pumping system was based on a Denton DV-502A high vacuum evaporator. The DV-502A can reach 10$^{-4}$ Torr in the clean and outgassed system within three minutes, and 2×10$^{-5}$ Torr within four minutes in a standard 12″ diameter bell jar. The system is capable of approximately 2×10$^{-6}$ Torr with water cooling of the diffusion pump. A special base plate adaptor was machined to match the larger multi-port glass chamber used for laser processing. The glass chamber 10 consisted of a 6 inch diameter Pyrex glass cross 12 which was obtained from Corning, Inc. End plates 14, 16, 18 were machined from aluminum or Plexiglass and fitted with gaskets and O-ring seals.

Figure 9:
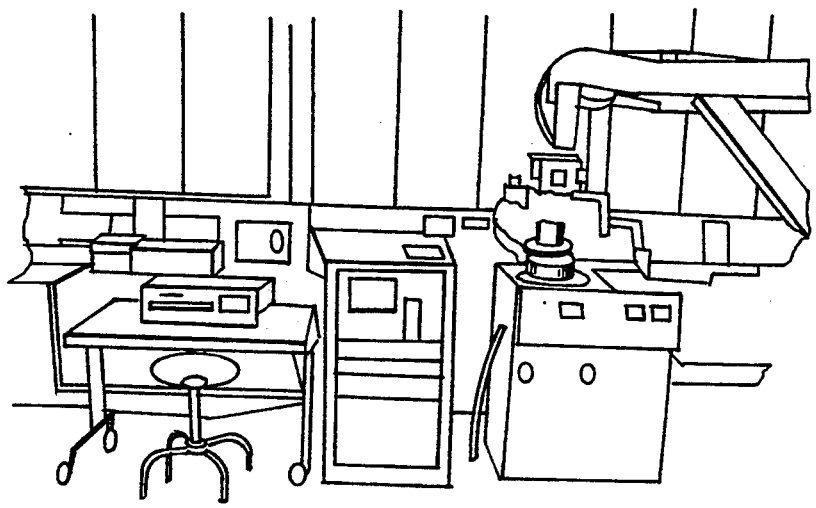
FIG. 9 shows a laser beam delivery system and motion controller.
Figure 10:
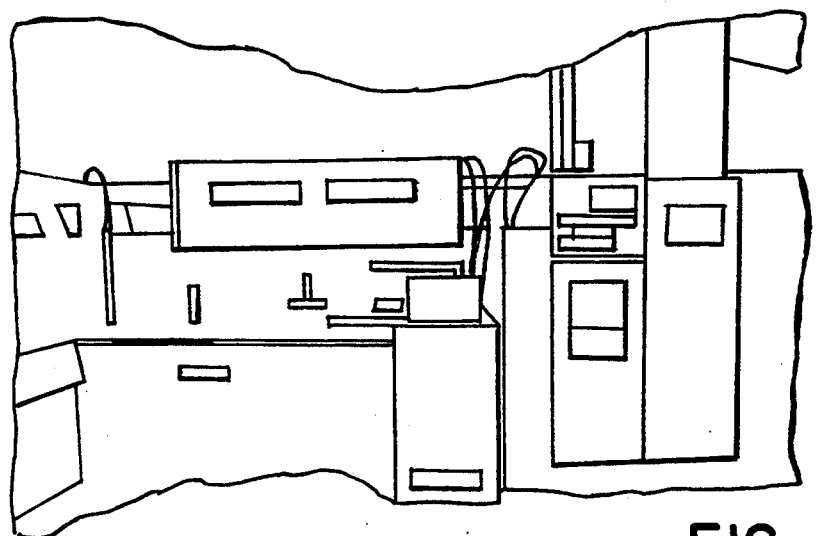
FIG. 10 shows a $CO_2$ laser system and power supply.

A ZnSe window assembly 20 was also designed for transmitting the CO$_2$ laser beam 22 into the chamber. The beam was reflected 24 vertically downward into the chamber by an enclosed beam delivery system as shown in FIG. 9. A 15 inch focal length ZnSe lens 26 mounted externally to the chamber was used to focus the beam through a 1.5 inch diameter window 28 centered in the top plate 16. The laser employed for the processing chamber was a 600 watt fast-axial flow CO$_2$ unit as shown in FIG. 10 (Spectra-Physics Model 810) equipped with a TEM$_{00}$ mode aperture and a 2:1 up-collimator.

Figure 11:
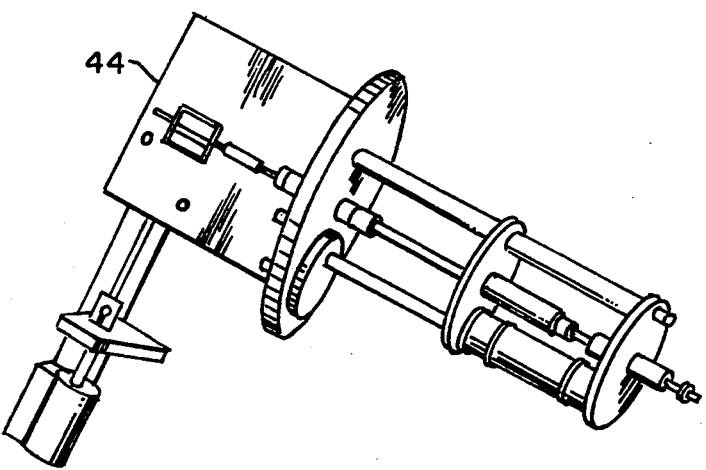
FIG. 11 shows a sample fixture with a right angle gear box.

A rotary sample holder 30 was design to position the samples under the beam and apply pressure to hold the sample pieces together during processing. The fixture was made to join 1 inch diameter circular windows to short lengths of 1 inch diameter tubing. Sample holders were machined in the form of shallow cups mounted on two axially aligned shafts 32, 34, as shown in FIG. 11. A sliding shaft and bearing arrangement with an adjustable spring 36 was used to press the two halves of the assembly together during processing. This design allows the heat from the laser beam to be evenly distributed around the circumference of the window by rapidly rotating the sample. A rotary feedthrough 38 with O-ring seals 40 was used to transfer motion into the chamber. An Aerotech DC brushless servo motor 42, controlled by an Aerotech Unidex 16 numerical controller, was used in conjunction with a right angle gearbox 44 to control the motion.

Figure 12:
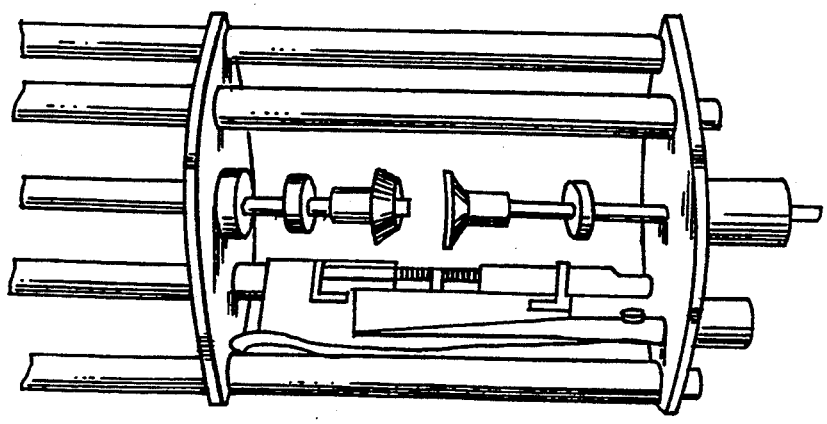
FIG. 12 shows a fixture with a heater and reflector.

An auxiliary heat element 46 was designed into the system to preheat the sample parts as shown in FIG. 12. The heater consisted of an 800 watt quartz-tungsten halogen lamp 48 powered from a 240 volt variable autotransformer. Current for the lamp was routed through an insulated electrical feedthrough. A type K thermocouple was mounted adjacent to the lamp to measure the preheat processing temperature. A stainless steel reflector was used to direct the heat and to contain reflections from the laser beam.

The system was tested and found to achieve minimum vacuum levels of 2×10$^{-5}$ Torr repeatably with a maximum leak rate of 0.1 Torr/hour.

Figure 13:
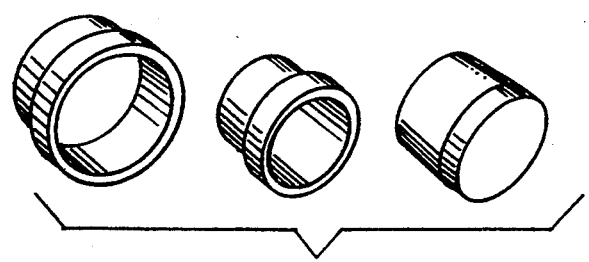
FIG. 13 shows brazed samples.

The vacuum processing chamber described in FIGS. 8a and 8b was used to fabricate 30 cylindrical ceramic/metal test samples. The sample geometry consisted of a circular ceramic window approximately 1 inch in diameter attached to a short length of cylindrical metal tubing. This geometry provides the greatest similarity to an actual radome, placing the ceramic material in hoop and radial bending stress, while at the same time being simple and amenable to laser processing in the vacuum chamber. Three finished laser brazed samples are shown in FIG. 13. Materials included Niobium/Cusil/Sapphire, Titanium/721/ZnS and Kovar/721/Pyroceram.

Raw materials were obtained from various vendors and reduced to the desired dimensions by grinding or machining. Available wall thicknesses for the metal tubing were: niobium: 0.103 inch; Kovar: 0.030 inch and Titanium (grade 2): 0.049 inch. Thickness of the ceramic window materials was 0.125 inch. The surfaces of the materials were prepared by cleaning in mild soap solution followed by ultrasonic cleaning in acetone. Oxides were removed from the metal brazing surfaces with 600 grit emery paper and second ultrasonic immersion in acetone. No sintering or refiring of ceramic materials was performed prior to brazing.

Braze filler material was preplaced at the joint in either paste form or in ring-shaped foil preforms, as indicated in FIG. 14. Laser energy was focused onto the opposite side of the joint to create a thermal gradient which induced filler flow. The careful placement of the paste was found to be necessary to the formation of a uniform joint. Although paste material was easier to apply, solid foil material often yielded better coverage due to the uniform thickness of the foil.

Initial experiments indicated that titanium and Kovar are good absorbers of $CO_2$ laser energy, whereas niobium is highly reflective and required some surface preparation to increase absorption. One solution was to coat the surface of the metal surrounding the joint with brazing paste, which was highly absorptive; however, that lead to undesirable reactions on the tube surface. A better solution was to roughen the exterior of the tube using sandblasting and to oxidize the surface by heating to 625° C. When oxidized in this manner, niobium formed a heavy white oxide which absorbed $CO_2$ laser radiation. The oxide turned black during laser heating and continued to absorb well. All of the ceramic materials absorbed well; however, sudden non uniform heating resulted in fracture, especially for thin materials. The rotating sample holder provided uniform heating and reduced the risk of thermal fracture.

The temperature data were measured using a Type K thermocouple and an electrical feedthrough into the chamber.

A laser processing temperature profile is shown in FIG. 15. Samples were assembled and placed in the spring loaded sample fixture as described earlier. The vacuum system was pumped down, and the parts were preheated using the auxiliary heat lamp. The sample was rotated during preheating to ensure uniform heating. The lamp current was increased manually from power levels of 25% to 40%, resulting in a temperature rise of over 500° C. in approximately 15 minutes. When the parts were preheated, the laser was actuated by opening an internal shutter, and laser power was manually increased until melting of the filler metal was observed in the processing chamber. The laser energy was held constant at this power for a variable time, then power was decreased to the initial power level. After closing the laser shutter, the lamp power was slowly decreased, with the sample still rotating to permit even cooling. After another variable length of time, the lamp was turned off, and the chamber was vented to atmosphere.

Processing conditions were systematically varied to determine laser parameters. A complete listing of the laser brazing parameters is given in Table IV. Process variables included preheat time, laser power ramp rate up, peak laser power and peak hold time, laser power ramp rate down, and cooling time as a function of lamp power. Vacuum levels of $2 \times 10^{-5}$ Torr were maintained during all processing with a measured leak rate of 100 mTorr/hour or less. Typical processing parameters were: 10 minutes sample preheat (525° C.), 50 watts/minute ramp rate up, 200 watts peak laser power, 2 to 5 minute hold at braze temperature (850° C.), 50 watts/min. ramp rate down, followed by a 15 to 20 min. cooling. The laser spot was about 0.15–0.20 in. (3.8–5.1 mm). The samples were rotated at 150 RPM for one hour.

TABLE IV

| | | Laser Brazing Process Parameters | | | | | |
|---|---|---|---|---|---|---|---|
| Sample | Materials | Preheat minutes | Ramp Rate up Watts/min | Peak Power Watts | Peak Hold minute | Ramp Down W/min | Cool min | Comment |
| 1 | Sapphire/Cusil/Nb | 10 | 50 | 350 | 1 | N/A | N/A | sample cracked, bearing melted |
| 2 | Sapphire/Cusil/Nb | 5 | 50 | 400 | 3 | N/A | 5/5 | sapphire cracked at perimeter |
| 3 | Sapphire/Cusil/Nb | 10 | 83 | 350 | 1 | N/A | 5/5 | good bond; sapphire cracked in center |
| 4 | Pyroceram/721/Kovar | 10 | N/A | 400 | 1 | N/A | N/A | sample fracture, hot spot, repair fixture |
| 5 | Pyroceram/721/Kovar | 10 | N/A | 350 | 1 | N/A | 10/5 | ceramic melted - move spot position |
| 6 | Pyroceram/721/Kovar | 10 | 50 | 300 | 1 | N/A | 10/15 | surface melt, shrinkage cracks |
| 7 | Pyroceram/721/Kovar | 10 | 50 | 315 | 1 | N/A | 15/20 | good bond, tested 550 C. to ice 12× |
| 8 | Pyroceram/721/Kovar | 10 | 50 | 200 | 2 | 200 | 10/15 | no surface melt, not hermetic (NWC #2) |
| 9 | Pyroceram/721/Kovar | 15 | 50 | 180 | 4 | N/A | 15/20 | surface melt; shrinkage cracks |
| 10 | Pyroceram/721/Kovar | 10 | 50 | 300 | 3 | 200 | 10/15 | not hermetic, shrinkage cracks (NWC #1) |
| 11 | Pyroceram/721/Kovar | — | 15 | 150 | 5 | 25 | NA | No melt of filler |
| 12 | Pyroceram/721/Kovar | 5 | 25 | 200 | 1 | 33 | 13/23 | Slight surface melt on tube |
| 13 | Pyroceram/721/Kovar | 5 | 25 | 200 | 3 | 50 | 11/21 | Increased rotation speed, no cracks, no melt |
| 14 | Pyroceram/721/Kovar | 5 | 100 | 200 | 3 | 50 | 10/15 | No melt of braze shiny Kovar |
| 15 | Pyroceram/721/Kovar | 5 | 40 | 180 | 2 | 40 | 10/20 | No bond to ceramic |
| 16 | Pyroceram/721/Kovar | 5 | 25 | 180 | 5 | 40 | 7/17 | Spot moved closer to ceramic |
| 17 | Pyroceram/721/Kovar | 30 | 20 | 180 | 15 | 500 | 11/23 | Repeat, longer hold time |
| 18 | Pyroceram/721/Kovar | 15 | 40 | 180 | 3 | 100 | 13/19 | |
| 19 | Pyroceram/721/Kovar | 15 | 25 | 200 | 3 | 33 | 10/21 | Paste uneven |
| 20 | ZnS/Cusil/Ti | 10 | 50 | 250 | 2 | 40 | 16/25 | Blew apart during leak testing |
| 21 | ZnS/Cusil/Ti | 10 | 50 | 250 | 2 | 40 | 16/25 | Cusil strips, even bonding |
| 22 | ZnS/Cusil/Ti | 10 | 50 | 250 | 3 | 50 | 12/22 | Good, hermetic using freon |
| 23 | ZnS/Cusil/Ti | 10 | 50 | 250 | 3 | 50 | 12/22 | Foil rings, hermetic 5 × 10−5 Torr |
| 24 | ZnS/721/Ti | 10 | 50 | 250 | 2 | 50 | 12/22 | Paste, hermetic 1 × 10−4 Torr |
| 25 | ZnS/721/Ti | 10 | 50 | 250 | 5 | 50 | 12/22 | Fractured when quenched 200 C. to Nitrogen |
| 26 | ZnS/721/Ti | 10 | 50 | 250 | 2 | 50 | 12/22 | Fractured |
| 27 | ZnS/721/Ti | 10 | 50 | 250 | 2 | 50 | 12/22 | 18 cycles 0–200 C. |
| 28 | ZnS/721/Ti | 10 | 50 | 250 | 3 | 50 | 4/9 | 50 cycles 0–200 C. |
| 29 | Sapphire/Cusil/Nb | 10 | 50 | 300 | 2 | 50 | 10/20 | Edge cracking in sapphire |
| 30 | Sapphire/Cusil/Nb | 10 | 50 | 350 | 1 | 50 | 10/20 | Edge cracking in sapphire |

The following describes the results obtained from testing and characterization of the experimental joints. Results of hermeticity and thermal tests are presented first, followed by results of microstructural characterization. A discussion of critical parameters to be optimized is also given.

The ceramic-to-metal samples were evaluated for hermeticity and their ability to withstand thermal cycling tests without fracture or joint separation. Mission requirements dictate that the joints withstand temperatures in excess of 550° C. for at least one minute and repeated thermal cycling from −40° to 200° C. (150 cycles). Absolute values of joint tensile strength were measured. A summary of the hermeticity and thermal cycling results is given in Table V.

TABLE V

Hermeticity and Thermal Cycling Results

| Sample | Hermeticity | High Temperature 550° C. | Thermal Shock | Thermal cycling 0° C.-200 |
|---|---|---|---|---|
| Sapphire/Cusil ABA/Niobium | 20 psi freon | Yes | | 200 to −200° C. 50 cycles |
| ZnS/721/Titanium | $5 \times 10^{-5}$ Torr <360 mTorr/hr | Yes | | 200 to −200° C. 18 cycles |
| Pyroceram/721/Kovar | No | Yes | | 550 to −200° C. 50 cycles |

High temperature testing was performed by heating joints to 600° C. for 10 minutes in a furnace. All the joints tested withstood this temperature since this is well below the liquidus of the braze alloys used. Some oxidation occurred but did not externally affect the joints.

Samples were tested for thermal shock resistance by heating to 550° C. in a furnace and then plunging into ice water. One Pyroceram/721/Kovar sample survived twelve such thermal cycles before bond failure. Low temperature thermal shock tests were performed by heating samples to 200° C. and plunging into liquid nitrogen (−196° C.). The ZnS samples survived two cycles, failing in the ceramic at the interface. Sapphire samples retained strong bonds, but cracked sapphire window material.

More moderate, long term thermal testing was performed by cycling samples from 0° C. (ice water) to 200° C., allowing the samples to aircool between cycles. This test is more realistic and represents the ability of the joint to withstand expected temperature variations under normal service conditions. Several joints withstood 50 cycles under these conditions with no apparent degradation. Samples were not tested beyond 50 cycles.

A special apparatus was designed to test joints for hermeticity. The apparatus uses a TIF5500 Automatic Halogen Leak Detector and pressurized freon gas. Samples were placed over a tube with O-ring seals, clamped in place using a bracket, pressurized with Freon gas to 20 psi, then inspected manually using a pump-style sensing tip. The device responds to minute traces of halogen gas (3 PPM); ½ oz. yr. leak rate. The device proved valuable in very quickly detecting gross leaks in samples. However, a Pyroceram/721/Kovar joint which appeared to be hermetic using the Halogen leak detector was found to contain leaks in subsequent vacuum testing by NWC. The reason for this discrepancy is still not known, but may be due to the large size of the freon gas molecule. Therefore, a true vacuum test was developed to ensure hermeticity and measure leak rate.

An adaptor plate was machined to allow sealing the sample to the vacuum chamber. The plate was positioned at the top of the chamber in the ZnSe window port. Vacuum seal putty was used to seal the outside of the tube. Hermetic joints were observed in two samples of ZnS brazed to Ti using Lucanex paste. A vacuum level of $1 \times 10^{-4}$ Torr was measured for sample 24 with a leak rate of less than 0.85 Torr/hour, and a vacuum level of $5 \times 10^{-5}$ Torr was measured for sample 23 with a leak rate of less than 0.3 Torr/hour.

Structural analysis and crystallographic phases were identified by X-ray diffraction patterns using a Phillips PW 1729 diffractometer with nickel filtered Cu ($K_\alpha$) radiation operating at 40 kV, 20 Ma with 0.02°/min. scanning rate over the scanning range of $2\theta$ from 0° to 70°. Surface morphology at various stages of processing was mainly performed using scanning electron microscope (JOEL 35C). Energy dispersive x-ray analysis was also performed on the ceramic/filler/metal interfaces using DXX KEVEX.

Figure 16A:
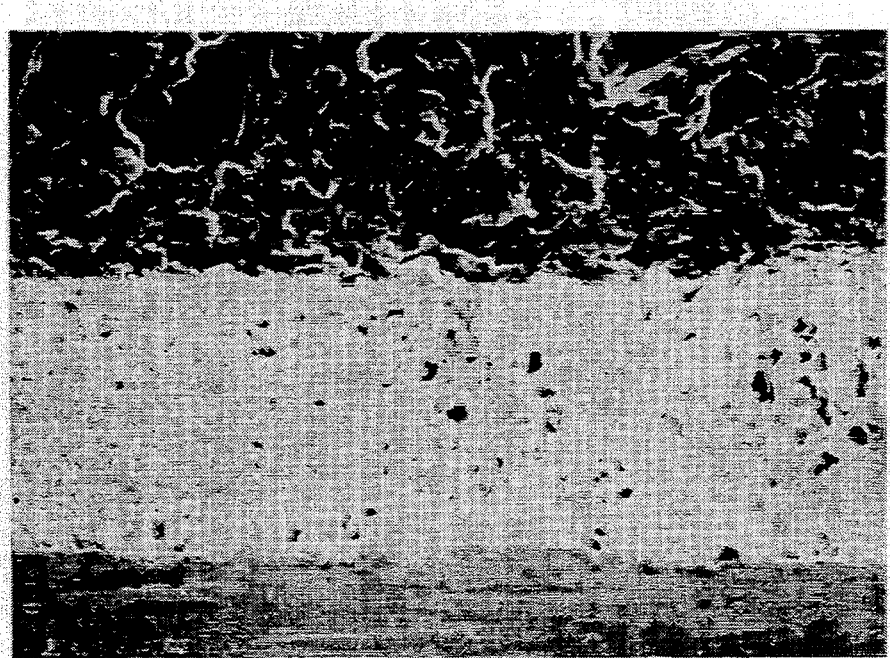
Figure 16B:
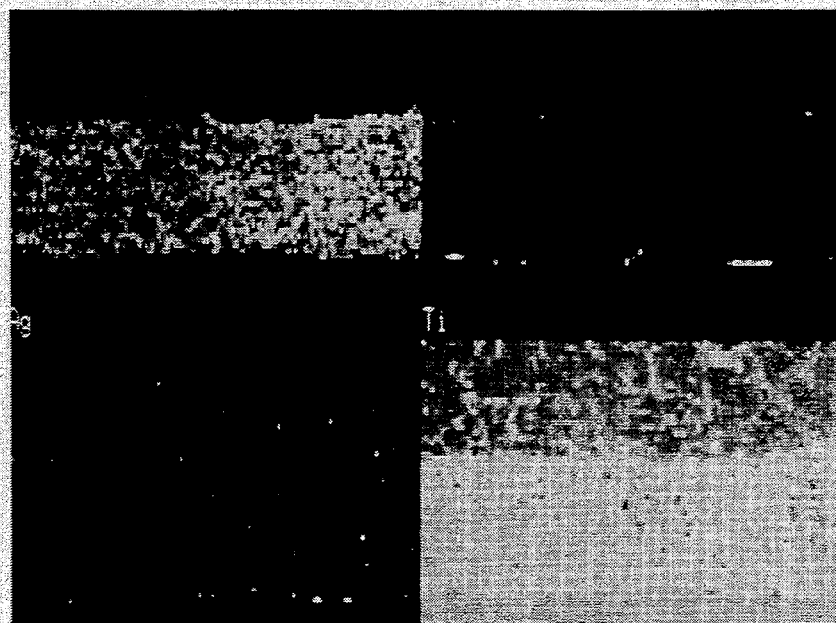

FIG. 16a shows an X-ray map of Ag (silver), Cu (copper) and Ti (titanium) over the secondary electron image area. Silver can be observed to be a filler material between the sapphire and niobium. Copper from the filler has been observed to diffuse 40 microns in the sapphire, whereas titanium has been observed to segregate at the boundaries of the filler/metal and filler/ceramic junctions forming an interfacial layer. The interdiffusion of copper in the sapphire layer promises a strong bond.

Figure 17A:
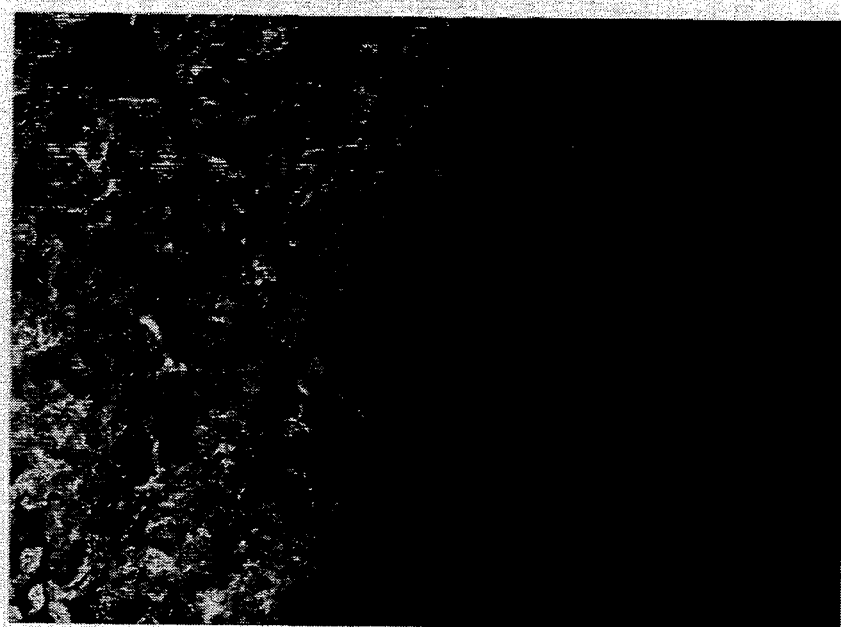
Figure 17B:
Figure 18A:
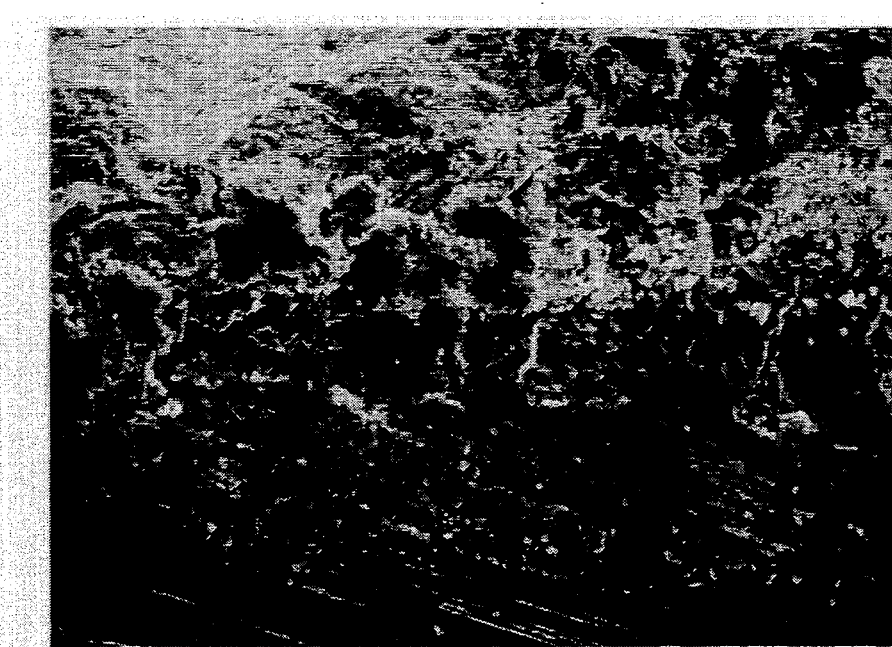

FIG. 17a shows a secondary electron image of laser brazed PYROCERAM to KOVAR using Lucanex 721 as a brazing or filler material. FIG. 17b shows the X-ray mapping of Ag, Cu and Ti over the secondary electron image area. Silver acted as a filler material and has been observed to diffuse 20–25 microns in the KOVAR. Copper was observed to diffuse 40–50 microns in KOVAR due to laser processing. Titanium was observed to segregate in order to form an interfacial layer at the junction of the Kovar and filler material. FIG. 18a shows the secondary electron image of zinc sulfide joined to titanium using Cusil ABA as brazing material.

Figure 18B:
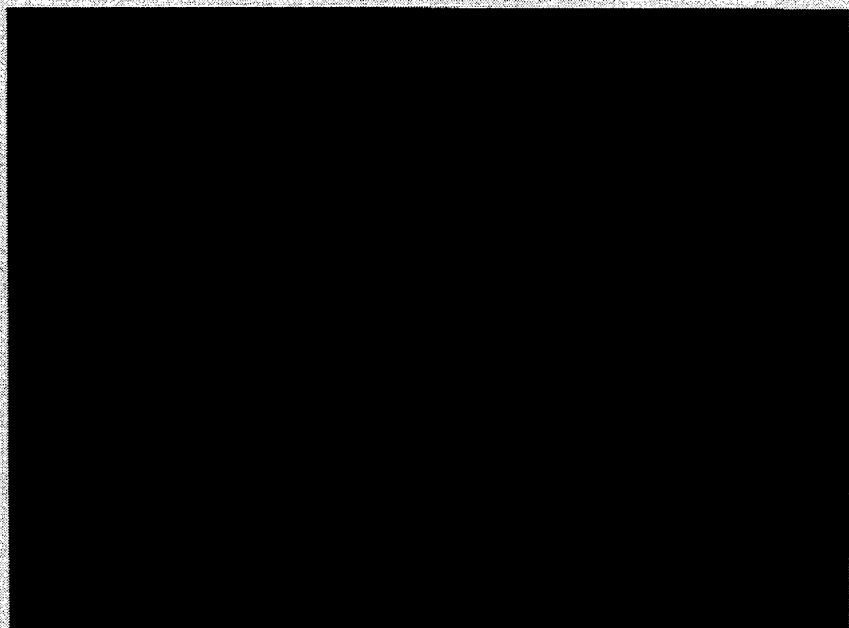

FIG. 18b shows an X-ray map of Ag, Cu and Ti in the secondary electron image of FIG. 18a. Silver was observed to act as a filler material, and copper was observed to diffuse 40 microns in the zinc sulfide. Titanium from the metal tube was observed to enrich the Cusil filler composition at the Ti/Cusil interface.

Figure 19A:
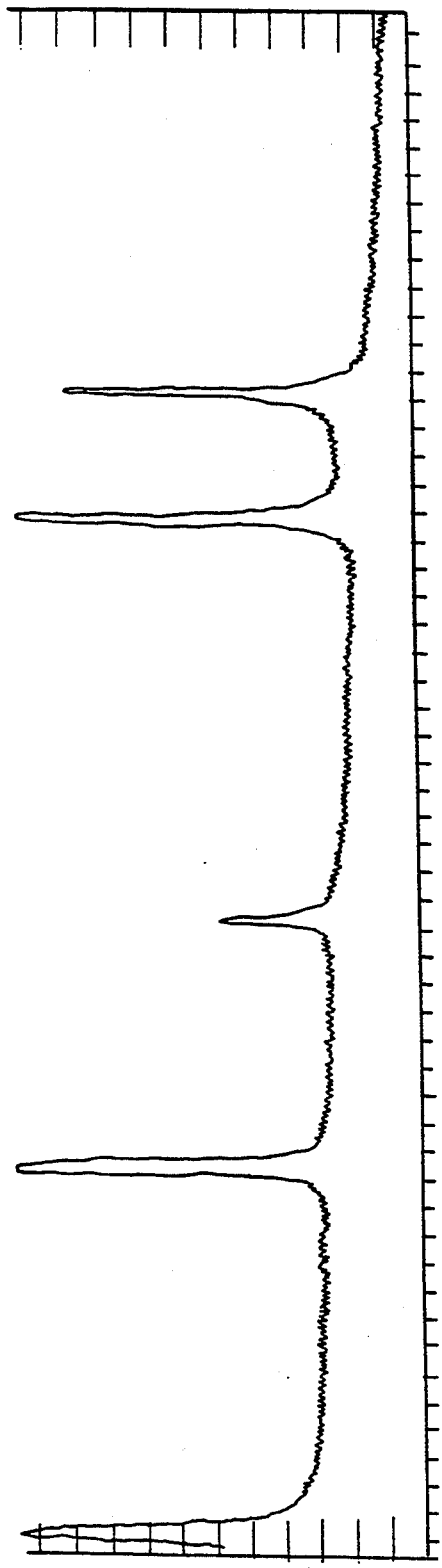
FIGS. 19a and 19b show X-ray diffraction patterns of an unbrazed and a brazed zinc sulfide window.
Figure 19B:
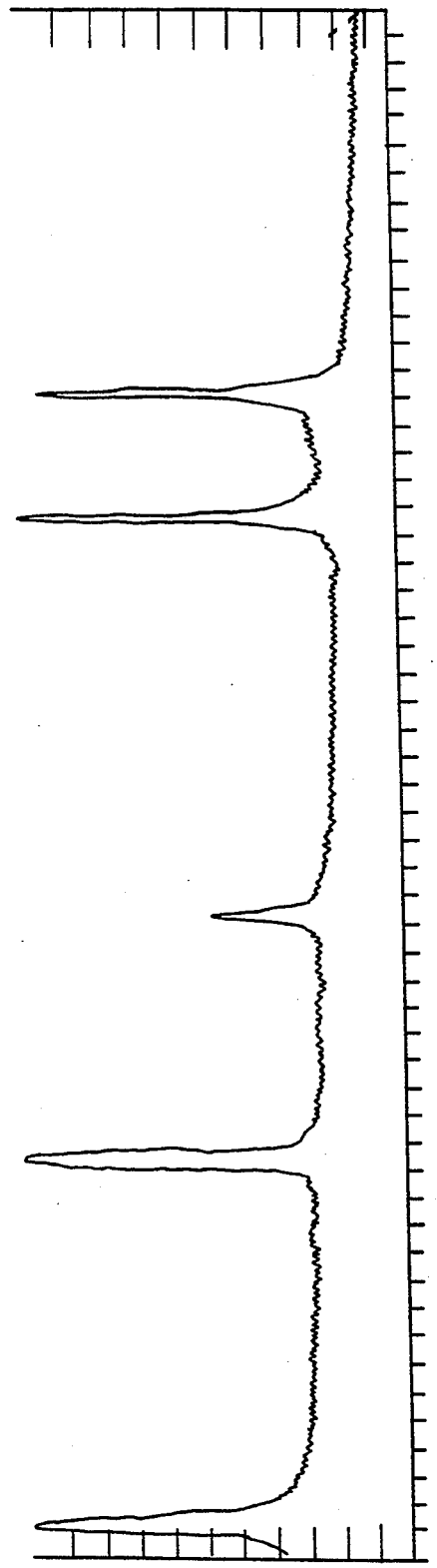

FIG. 19a shows the X-ray diffraction pattern of the unprocessed zinc sulfide (ZnS) sample, wherein FIG. 19b shows the X-ray diffraction pattern of a ZnS sample after laser brazing to Kovar using Cusil brazing material. Similar diffraction peaks in 19a and 19b indicated no structural changes in ZnS when laser brazing was performed to join ceramic to metal. The absence of a heat affected zone in ZnS demonstrates the benefit of localized heating by laser in brazing applications.

SEM was also performed on samples brazed in atmosphere using spodumene and lead-zinc-borosilicate glass filler. SEM was performed using a Phillips 505 scanning electron microscope. Samples were prepared by coating with 15 nm of gold vanadium alloy in a Hummer-X sputter coater. Photographic images from the secondary electron detector were obtained on Polaroid 55 film.

Figure 24:
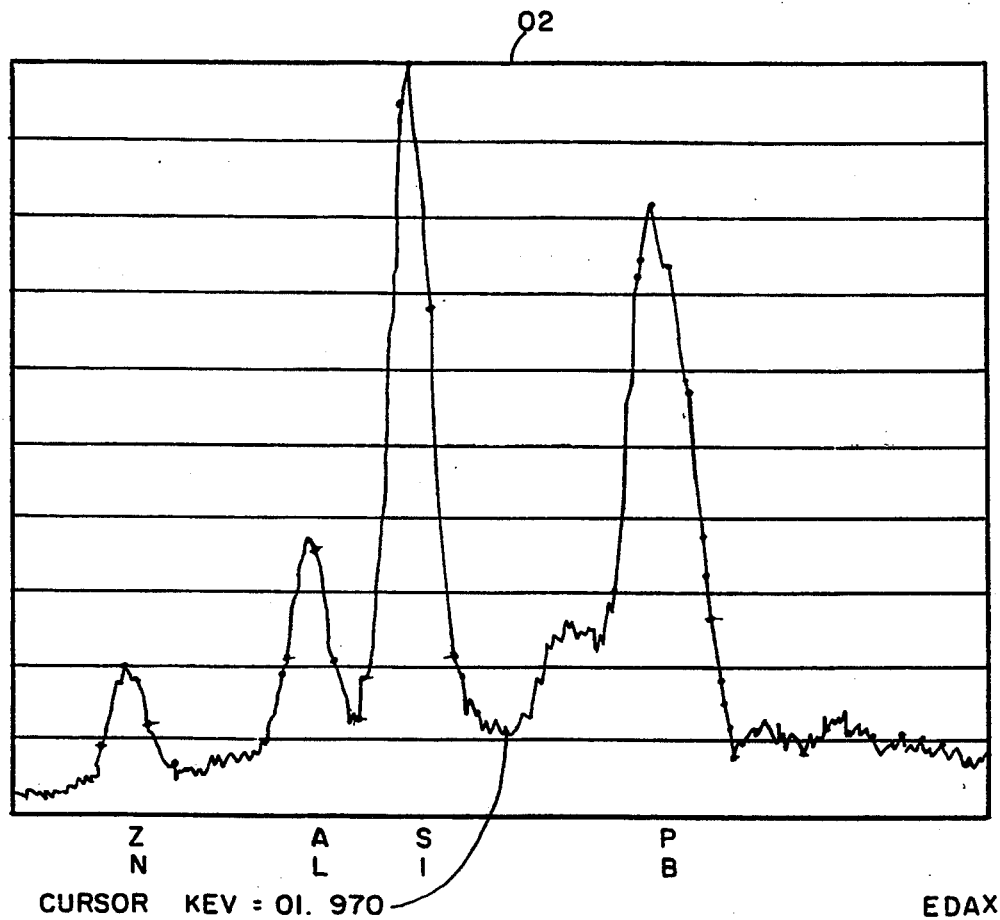
FIG. 24 is an elemental analysis of filler material.
Figure 20:
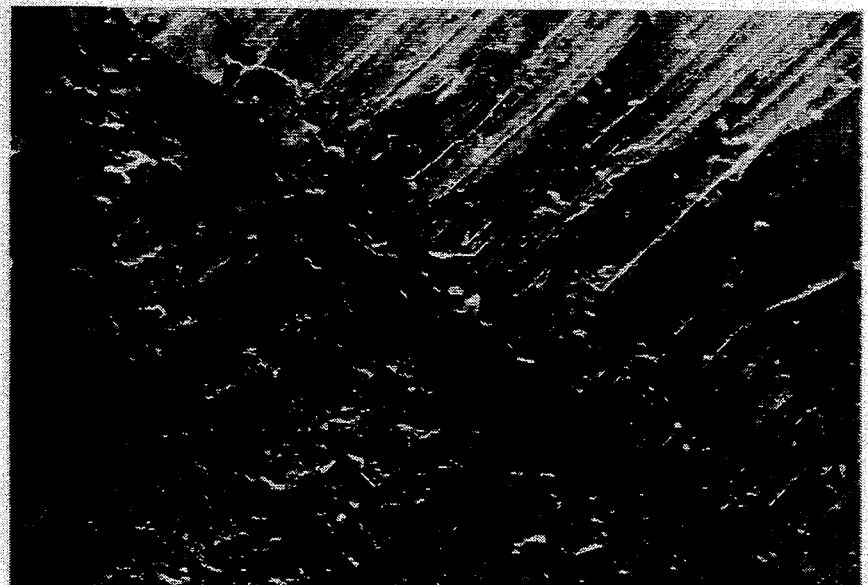
FIGS. 20–23 are photomicrographs of joints.
Figure 21:
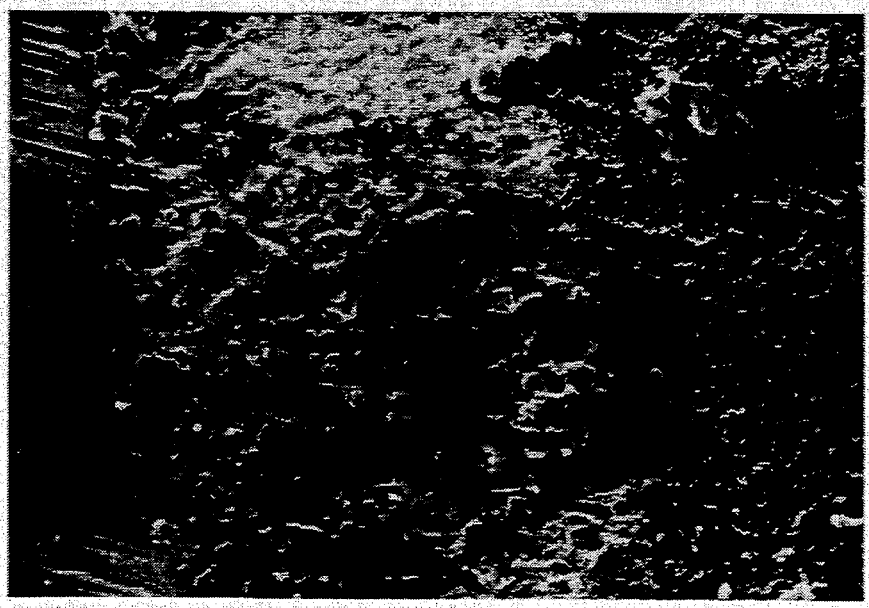
Figure 22:
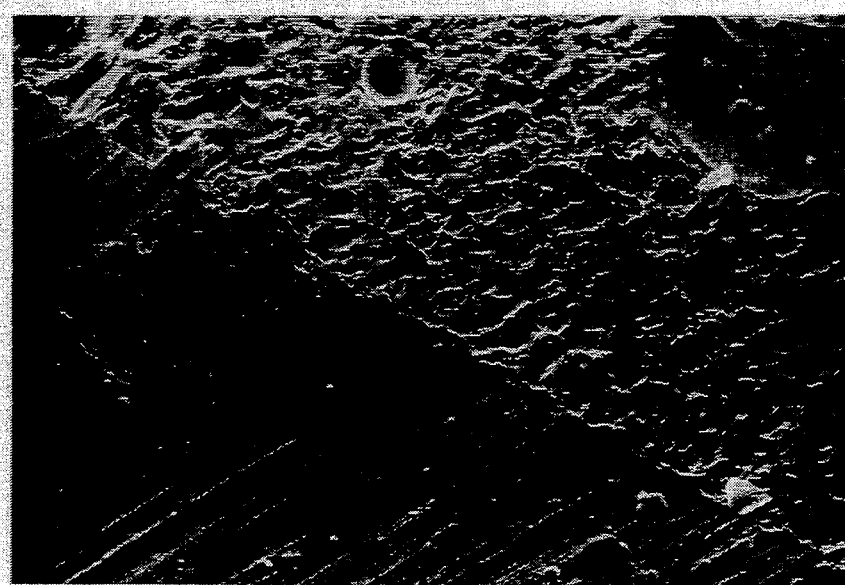
Figure 23:
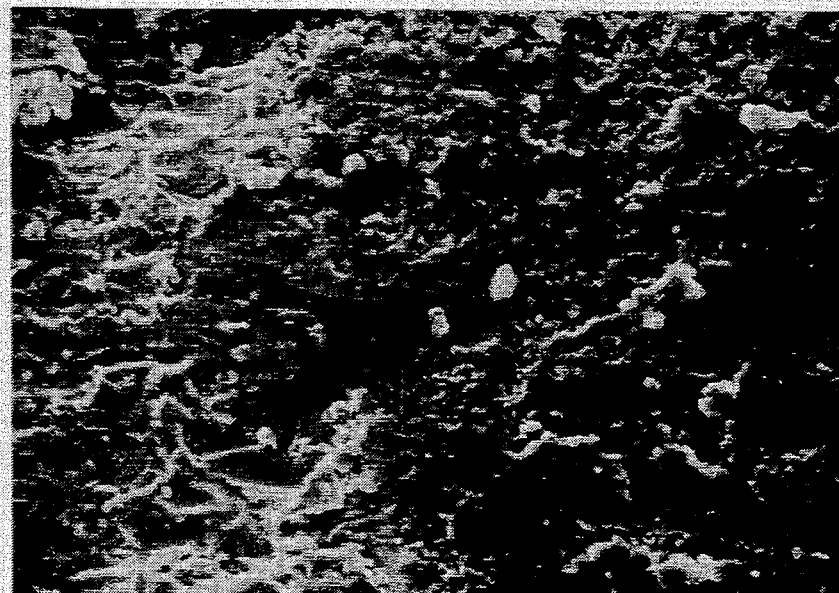

FIG. 20 is a photograph of the joint formed between Pyroceram and Kovar using lead-zinc borosilicate glass sealant. A glass ceramic composition of $Li_2O$ 2.4%, PbO 69.7%, $B_2O_3$ .5%, ZnO 10.5%, $SiO_2$ .3%, and $Al_2O_3$ 11.6% weight percent was used to form a joint between Kovar and alumina shown in FIG. 21. The Kovar/glass interface is shown in FIG. 22. The alumina interface is shown in FIG. 23. X-ray elemental analysis was performed on the filler material using an EDAX 9100. FIG. 24 shows the presence of Zn, Al, Si and Pb elements in the filler material.

Zinc and lead appear to act as nucleating agents to the glass during the laser melting operation in order to initiate copious nucleation to form a crystalline nucleating phase. The major crystalline phase or phases subsequently grow on particles of the nucleating phase. Such a process could also be operative in the case of oxide nucleating agents, but in many cases these melt additions seem to be effective in promoting a phase separation process. The separation can provide a fine dispersion of second-phase material, which can then form a crystalline nucleant phase. The role of phase separation in the nucleation process can be associated with three factors: 1) the formation of an amorphous phase of relatively high mobility in a temperature range in which there is a large driving force for crystallization allowing crystal nucleation to occur rapidly; 2) the introduction of second-phase boundaries between the phase-separated regions in which the nucleation of the first crystalline phase may take place; and 3) the provision of a driving force for crystallization in cases in which no such driving force exists for the homogeneous solution. Of these possibilities, the first seems to be the most important and the most generally applicable.

The experimental results and theoretical evaluations have been used to optimize the proof-of-concept system. Many aspects of the brazing process were determined, such as laser power densities and interaction times. However, refinement and modifications of the original system were needed to optimize the process. Specifications for an engineering model are now discussed.

A difficult parameter to optimize in ceramic-to-metal joining is the time/temperature heating cycle, in particular the diffusion time, cooling rate and annealing conditions. Optimal process conditions will vary for each individual material system and can play a significant role in the long-term reliability and strength of the joint. In particular, many high-expansion glass components and glass-ceramic materials call for carefully controlled cooling rates and multiple annealing cycles to achieve optimal strength and devitrification. This calls for a more elaborate heating system.

The laser, while ideally suited for application of precise amounts of energy in localized regions of the material, is not an ideal heat source for producing uniform temperature values associated with a prolonged heat treatment. A conventional heat source is more practical and should be employed for controlling the temperature cycle below the melt temperature or softening point of the joint material. A vacuum furnace with microprocessor-controlled heating and cooling rates is normally used to minimize thermal stresses in the ceramic. The thermal expansions of the base metal and the ceramic should follow similar behavior from room temperature to about the solidus temperature of the filler metal. Consequently, the typical brazing schedule is to heat to about 122° F. (50° C.) below the solidus temperature where melting begins, and hold at this temperature for a given time until all the parts, including the brazing fixture, reach uniform temperature. The temperature then is increased above the liquidus (77° to 122° F., 25° to 50° C.) to obtain complete melting, is held at this temperature for up to ten minutes, and then is cooled.

Specific regions of the joint geometry can be raised above the melt temperature by applications of small amounts of laser energy. A unique characteristic of laser technology is found in its capacity to create localized temperature gradients above the melt temperature which controls the flow characteristics of the filler. Molten filler material was observed to flow toward the laser interaction zone during many experiments. This is consistent with the principle that molten brazing material tends to flow toward areas of higher temperature. This effect, caused by increased surface activation energy, can be used to "guide" the molten metal to the desired location in the joint precisely by using the laser.

In order to achieve repeatable processing conditions, the laser power, rotary motion and secondary heat source parameters are brought under computer control. This can be accomplished through the use of digital interface boards and analog control signals from an IBM-compatible personal computer. Temperature can be regulated by a PID or similar control algorithm utilizing temperature sensor feedback from the vacuum chamber. Laser power can be ramped up and down at programmable rates using analog voltage signals at the power supply control panel. Rotary motion can also be synchronized through an RS232 link with the motion controller. Additional features such as safety shutter interlocks and vacuum controls may be integrated to enhance the automation.

Another parameter which was found to be critical is the joint fit-up and accuracy of the fixturing. The rotating sample holder is conceptually sound, but will require much refinement in practice; in particular the problems of maintaining low runout, low friction and dimensional stability at temperatures in excess of 500° C. Materials, bearings and fasteners must be fabricated to operate at these high temperatures. An optimized system may include water cooling of critical bearing components and a precision rotary feedthrough to reduce runout and vibration. If the parts being joined are larger, up to 5 inches (127 mm) or above, the problem becomes more complicated. A combination of proper engineering design, low brazing temperature and ductility of filler alloy is necessary for successful joining.

The placement of filler materials in the joint design was also found to be a critical parameter. While paste fillers were found to be more convenient and easier to apply, solid filler metal in pre-cut foils yielded more uniform braze dimensions and placement. The optimal joint design must take into consideration the placement, retention and flow path of the filler material relative to the laser beam. Further work may be useful in the area of joint design to determine optimal material thickness, joint tolerances and gap dimensions.

In summary, an optimized laser brazing system may incorporate the following features. A microprocessor-controlled secondary heat source may be included for precise control of heating/cooling rate and annealing cycles. Laser functions, laser power ramping, heating rates and rotary motion may be integrated for repeatable, automated processing. High temperature fixturing for precise joint tolerances may incorporate water cooled bearings and low friction feedthroughs. Improved joint design may take into consideration the placement, retention and flow path of the filler materials.

The overall goal of establishing the feasibility of developing hermetic, temperature stable joints using laser brazing techniques has been demonstrated.

The evaluation of candidate braze materials was accomplished by performing brazing experiments in oxidizing, inert and vacuum environments. Innovative glass ceramics were produced by addition of zinc to spodumene and cordierite. Superior wetting was achieved by addition of spodumene and zinc to lead borosilicate glass. Silver-Copper-titanium alloys, in foil and paste form, were also evaluated by conventional furnace brazing and laser brazing. Metals were selected with low-to-moderate coefficients of thermal expansion to match a number of ceramic materials of current interest to the military.

Design and fabrication of a laser processing vacuum chamber was accomplished using a four-port glass tube mounted on a Denton DV-502A high vacuum evaporator. This system is capable of achieving $10^{-7}$ Torr in the clean and outgassed system. A special adaptor plate was manufactured to match the larger multi-port chamber for use in laser processing. A ZnSe window assembly was also fabricated for transmitting the $CO_2$ laser beam into the chamber. A rotary sample holder was designed to join circular windows to sections of metal tubing, and a secondary heat source was installed to preheat the specimens. An Aerotech DC brushless servo motor, under computer control, was used to rotate the samples.

Selection was made of laser process parameters and fabrication of samples, and over thirty ceramic-to-metal couples were fabricated in the vacuum brazing chamber. Laser power densities from 100 W/cm$^2$ to 200 W/cm$^2$ were used in conjunction with interaction times of 60 to 600 seconds to melt the braze joint materials. Other parameters included laser ramp rate, peak hold time and cooling rate. Bonded ceramic-to-metal couples were produced using Kovar/721/Pyroceram, Titanium/721/ZnS, and Niobium/721/Sapphire.

Acquisition of families of test data was achieved through characterization using SEM, XRD, EDX, hermeticity testing and thermal cycling. Several bonds survived heating to above 550° C. for 10 minutes or more and through 50 cycles from 0° C. to 200° C. Additional samples were cycled from −198° C. (liquid nitrogen) to 200° C. A vacuum level of $5 \times 10^{-5}$ Torr was measured for a ZnS/Ti sample we with a leak rate of less than 0.36 Torr/hour. No change in the crystal structure of laser brazed ZnS was observed.

Based upon the results presented herein, it is possible to draw the following conclusions. All of the conditions required to achieve reliable joints in conventional brazing are equally applicable to laser brazing. These include good fit and proper clearances, cleaning and surface preparation of the materials, flux, inert atmosphere or vacuum to prevent oxidation, accurate fixturing to retain parts in correct alignment, and uniform heating at controlled temperature levels.

Thermal expansion coefficients of the materials must be carefully matched when brazing ceramic-to-metal.

Laser joining is feasible using both active metal brazing alloys and glass ceramic materials, provided the wetting characteristics are sufficient to promote chemical bonding.

Preheating of the parts and controlled cooling rates are needed to prevent thermal fracture and to reduce stresses in the ceramic.

Uniform distribution of laser energy can be achieved by rotating the parts.

Adequate surface absorption characteristics are required, and some surface modification of parts are necessary with highly reflective metals.

Vacuum brazing is necessary to prevent contamination of active alloy processing.

Laser brazing holds the potential to significantly reduce the braze reaction time, during which the braze filler is above the melt temperature.

Thermally sensitive materials such as zinc sulfide can be joined to metals without altering the bulk crystalline structure of the ceramic by laser brazing. This was achieved using active silver-copper alloy (melt temperature 860° C.).

Laser brazing can be accomplished with laser powers less than 400 watts.

The invention provides an advanced brazing process for joining ceramic-to-metal components. The brazing system is useful in joining advanced IR or RF ceramics from the availability of a high-temperature braze with well-matched coefficients of thermal expansion for ceramic-to-metallic materials. Benefits may accrue from the use of alumino-silicate coatings for high temperature missile radomes exposed to oxidative and hydrothermal conditions. The coating may find application in the protection of advanced ceramic materials against degradation.

The invention will result in the development of a laser brazing process for joining diverse materials with minimal thermal distortion. The ceramic-metal composite materials have applications for gas turbine and diesel engine requirements, for high temperature sensors and as structural components for aerospace applications.

While the invention has been described with reference to specific embodiments, modifications and variations of the invention may be constructed without departing from the scope of the invention, which is defined in the following claims.

We claim:

1. A method of forming a brazed joint between a ceramic material and a metal structure with a braze filler comprising:
   forming a joint by juxtaposing the material, structure and filler;
   pressing the material and structure together; mounting the joint in a chamber;
   preheating the material, structure and filler in the chamber to a temperature below a melt temperature of the filler;
   traversing a periphery of the joint with a high energy beam by relatively moving the joint and the beam;
   increasing temperature in the joint by the relatively moving beam to melt temperature of the filler;
   flowing filler in the joint;
   discontinuing the beam;
   gradually reducing temperature in the chamber; and
   gradually cooling the joint.

2. The method of claim 1, wherein the ceramic material is zinc sulfide, and the metal structure is titanium or niobium.

3. The method of claim 1, wherein the metal structure is niobium or titanium, and the ceramic material is sapphire.

4. The method of claim 1, wherein the metal structure is an iron-nickel-cobalt alloy and the ceramic material is an IR and RF transmitting ceramic window material or germanium.

5. The method of claim 1, wherein the high energy beam is a $CO^2$ laser beam.

6. The method of claim 1, further comprising rotating the joint in the chamber while preheating the joint.

7. The method of claim 1, further comprising removing atmospheric gases from the chamber before increasing temperature.

8. The method of claim 7, wherein the braze filler comprises silver titanium copper alloy.

9. The method of claim 1, wherein the braze filler comprises a glass-ceramic oxide.

10. The method of claim 9, wherein the braze filler further comprises zinc oxide, spodumene and cordierite.

11. The method of claim 9, wherein the braze filler further comprises zinc oxide, spodumene and borosilicate glass.

12. The method of claim 9, wherein the braze filler further comprises lead zinc borosilicate glass and $\beta$ spodumene as a dense glass ceramic filler.

13. The method of claim 9, wherein the braze filler further comprises 10% to 30% lead zinc borosilicate glass and 90% to 70% by weight $\beta$ spodumene as a dense glass ceramic filler.

14. The method of claim 9, wherein the braze filler further comprises 30% by weight spodumene added to lead zinc borosilicate.

15. The method of claim 9, wherein the braze filler further comprises lead oxide, zinc oxide and boron oxide added to spodumene for lowering melting temperature and for improving wetting properties and adherence of spodumene to the ceramic material and the metal structure.

16. The method of joining and sealing, comprising placing a circuit medium on a metallic or ceramic substrate, placing a ceramic glass brazement on the medium and substrate, heating the substrate, medium and brazement to a temperature below a melting temperature of the brazement, traversing the substrate with a high energy beam while relatively moving the substrate and the beam, heating the brazement to a melting temperature of the brazement and melting the brazement, discontinuing the beam, cooling the brazement and solidifying the brazement, reducing temperature of the substrate, medium and brazement while continuing heating, reducing heating and cooling the substrate medium and brazement and thereby joining the medium to the substrate.

* * * * *